United States Patent
Hwang et al.

(10) Patent No.: US 12,380,620 B2
(45) Date of Patent: Aug. 5, 2025

(54) ARTIFICIAL INTELLIGENCE DEVICE AND 3D AGENCY MOTION CONTROLLING METHOD THEREOF

(71) Applicant: LG ELECTRONICS INC., Seoul (KR)

(72) Inventors: Taeju Hwang, Seoul (KR); Jongjin Park, Seoul (KR); Yubin Yoon, Seoul (KR); Taehwan Hwang, Seoul (KR); Hyoyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 228 days.

(21) Appl. No.: 18/199,030

(22) Filed: May 18, 2023

(65) Prior Publication Data

US 2024/0203013 A1   Jun. 20, 2024

(51) Int. Cl.
 *G06T 13/20* (2011.01)
 *G06T 7/70* (2017.01)
 (Continued)

(52) U.S. Cl.
 CPC ............. *G06T 13/205* (2013.01); *G06T 7/70* (2017.01); *G06T 13/40* (2013.01); *G06T 19/20* (2013.01);
 (Continued)

(58) Field of Classification Search
 CPC ............. G06V 30/19093; G06V 10/82; G06V 30/10; G06T 19/20; G06T 13/40;
 (Continued)

(56) References Cited

U.S. PATENT DOCUMENTS

| | | | |
|---|---|---|---|
| 11,574,629 | B1* | 2/2023 | Stewart ................. G06V 20/41 |
| 2012/0041947 | A1 | 2/2012 | Maeda et al. |

(Continued)

FOREIGN PATENT DOCUMENTS

| | | |
|---|---|---|
| JP | 2004310034 | 11/2004 |
| JP | 2012043000 | 3/2012 |
| KR | 1020130004050 | 1/2013 |
| KR | 101696555 | 2/2017 |
| KR | 102148021 | 8/2020 |

OTHER PUBLICATIONS

PCT International Application No. PCT/KR2022/020597, International Search Report dated Aug. 25, 2023, 10 pages.

(Continued)

*Primary Examiner* — Xilin Guo
(74) *Attorney, Agent, or Firm* — LEE, HONG, DEGERMAN, KANG & WAIMEY

(57) ABSTRACT

An artificial intelligence device is configured to: when a spoken sentence of a three-dimensional agency is generated, extract a keyword of the spoken sentence; acquire related content associated with the keyword of the spoken sentence to detect positions of an object and text in the related content; when an object and text corresponding to the keyword of the spoken sentence exist in the related content, map the positions of the object and the text corresponding to the keyword of the spoken sentence to three-dimensional coordinates; output the related content to a surrounding space of the three-dimensional agency; and control the operation of the three-dimensional agency so that the three-dimensional agency performs an utterance operation corresponding to the spoken sentence and an indication operation of indicating three-dimensional coordinates at which the object and the text of the related content are located.

15 Claims, 21 Drawing Sheets

(51) Int. Cl.
*G06T 13/40* (2011.01)
*G06T 19/20* (2011.01)
*G06V 30/19* (2022.01)
*G10L 15/22* (2006.01)

(52) U.S. Cl.
CPC ........ *G06V 30/19093* (2022.01); *G10L 15/22* (2013.01); *G06T 2219/2016* (2013.01); *G10L 2015/223* (2013.01)

(58) Field of Classification Search
CPC .................... G06T 7/70; G06T 13/205; G06T 2207/20081; G06T 2207/30256; G06T 2207/10024; G06T 2207/10048; G06T 2207/20084; G06T 2207/10016; G06T 2219/2016; G06T 2207/30201; G06T 11/60; G06T 11/206; G10L 15/22; G10L 2015/223; G10L 15/26; G10L 15/08; G06F 3/011; G06F 16/9535; G06F 3/167; G06N 20/00; G06N 3/08; G06Q 10/10; G06Q 30/0269; G06Q 30/0631
See application file for complete search history.

(56) References Cited

U.S. PATENT DOCUMENTS

| | | |
|---|---|---|
| 2012/0278719 A1 | 11/2012 | Hwang et al. |
| 2020/0226671 A1* | 7/2020 | Shin ........................ G06F 3/167 |
| 2021/0209289 A1* | 7/2021 | Kandur Raja ........ G06F 40/109 |
| 2022/0028393 A1* | 1/2022 | Kim ........................ G10L 15/02 |
| 2023/0057963 A1* | 2/2023 | Chen ................ H04N 21/44008 |

OTHER PUBLICATIONS

Redmon et al., "You Only Look Once: Unified, Real Time Object Detection", arXiv:1506.02640v5 [cs.CV], May 2016, 10 pages.
Kim et al., "Relevant Image Retrieval of Korean Documents based on Sentence and Word Importance", Journal of the Korea Academia-Industrial cooperation Society, vol. 20, No. 3 pp. 43-48, 2019, 6 pages.
Tesseract OCR, 4 pages, web page https://github.com/tesseract-ocr/tesseract.
YOLO: Real-Time Object Detection, 7 pages, web page https://pjreddie.com/darknet/yolo/.

* cited by examiner

ARTIFICIAL INTELLIGENCE DEVICE AND 3D AGENCY MOTION CONTROLLING METHOD THEREOF

CROSS-REFERENCE TO RELATED APPLICATIONS

Pursuant to 35 U.S.C. § 119, this application claims the benefit of an earlier filing date and right of priority to International Application No. PCT/KR2022/020597, filed on Dec. 16, 2022, the contents of which are hereby incorporated by reference herein in its entirety.

BACKGROUND

The present disclosure relates to an artificial intelligence device capable of controlling a motion of a three-dimensional (3D) agency so that the 3D agency indicates a specific position of 3D content corresponding to a spoken sentence, and a 3D agency motion controlling method thereof.

In general, artificial intelligence is a field of computer science and information technology that studies methods to enable computers to do thinking, learning, and self-development that can be done with human intelligence, and means enabling computers to mimic human intelligent behavior.

In addition, artificial intelligence does not exist by itself, but has many direct and indirect relationships with other fields of computer science. In particular, in modern times, attempts to introduce artificial intelligence elements in various fields of information technology and use them to solve problems in those fields are being very actively made.

On the other hand, technologies for recognizing and learning surrounding situations by using artificial intelligence, providing information desired by the user in a desired form, or performing operations or functions desired by the user are being actively studied.

An electronic device that provides such various operations and functions may be referred to as an artificial intelligence device.

Recently, artificial intelligence technology capable of learning a two-dimensional (2D) image by using artificial intelligence and implementing a target object as a three-dimensional (3D) image from the learned 2D image has been studied.

However, since this artificial intelligence technology simply implements a target object as a 3D image and cannot control the motion of the 3D target object in accordance with the spoken sentence, there is a limitation in providing a 3D content service that gives customers various interests and fun.

Therefore, in the future, it is necessary to develop an artificial intelligence technology capable of controlling a motion of a 3D agency to indicate a specific position of 3D content corresponding to a spoken sentence.

SUMMARY

The present disclosure aims to solve the above problems and other problems.

The present disclosure invention aims to provide an artificial intelligence device capable of controlling a motion of a 3D agency so that the 3D agency indicates a specific position of 3D content in accordance with a spoken sentence to thereby provide a 3D content service that gives customers various interests and fun, and a 3D agency motion controlling method thereof.

An artificial intelligence device according to an embodiment of the present disclosure may include: a memory configured to store a spoken sentence of a three-dimensional agency; and a processor configured to control an operation of the three-dimensional agency corresponding to the spoken sentence, wherein the processor may be configured to: when the spoken sentence of the three-dimensional agency is generated, extract a keyword of the spoken sentence; acquire related content associated with the keyword of the spoken sentence to detect positions of an object and text in the related content; when an object and text corresponding to the keyword of the spoken sentence exist in the related content, map the positions of the object and the text corresponding to the keyword of the spoken sentence to three-dimensional coordinates; output the related content to a surrounding space of the three-dimensional agency; and control the operation of the three-dimensional agency so that the three-dimensional agency performs an utterance operation corresponding to the spoken sentence and an indication operation of indicating three-dimensional coordinates at which the object and the text of the related content are located.

A three-dimensional agency motion controlling method of an artificial intelligence device according to an embodiment of the present disclosure may include: generating a spoken sentence of a three-dimensional agency; extracting a keyword of the spoken sentence; acquiring related content associated with the keyword of the spoken sentence; detecting positions of an object and text in the related content; determining similarity between the object and the text of the related content and the keyword of the spoken sentence; mapping the positions of the object and the text similar to the keyword of the spoken sentence to three-dimensional coordinates; outputting the related content to a surrounding space of the three-dimensional agency; and controlling the operation of the three-dimensional agency so that the three-dimensional agency performs an utterance operation corresponding to the spoken sentence and an indication operation of indicating three-dimensional coordinates at which the object and the text of the related content are located.

DETAILED DESCRIPTION OF THE EMBODIMENTS

Figure 1:
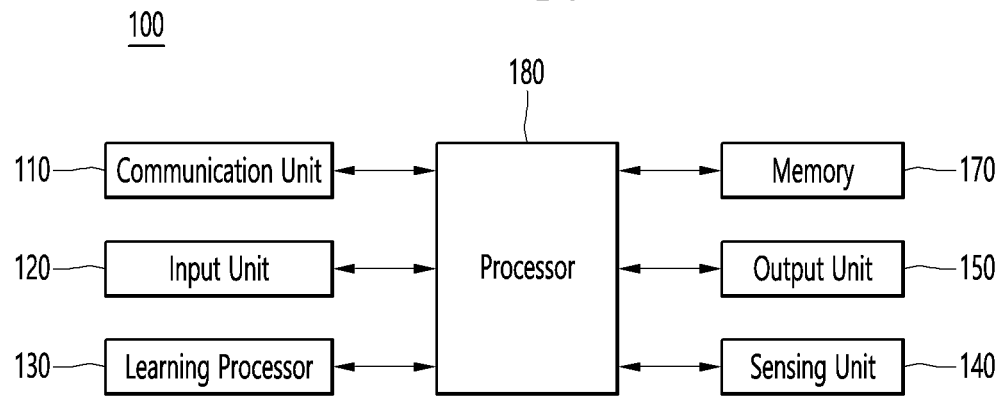
FIG. 1 illustrates an artificial intelligence (AI) device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Also, throughout this specification, a neural network and a network function may be used interchangeably. The neural network may be constituted by a set of interconnected computational units, which may be generally referred to as "nodes". These "nodes" may also be referred to as "neurons". The neural network is configured to include at least two or more nodes. Nodes (or neurons) constituting neural networks may be interconnected by one or more "links".

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of training an artificial neural network in a state in which a label for learning data is given, and the label may mean the correct answer (or result value) that the artificial neural network must infer when the learning data is input to the artificial neural network. The unsupervised learning may refer to a method of training an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<extended Reality (XR)> Extended reality is collectively referred to as virtual reality (VR), augmented reality (AR), and mixed reality (MR).

The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an artificial intelligence (AI) device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

Figure 2:
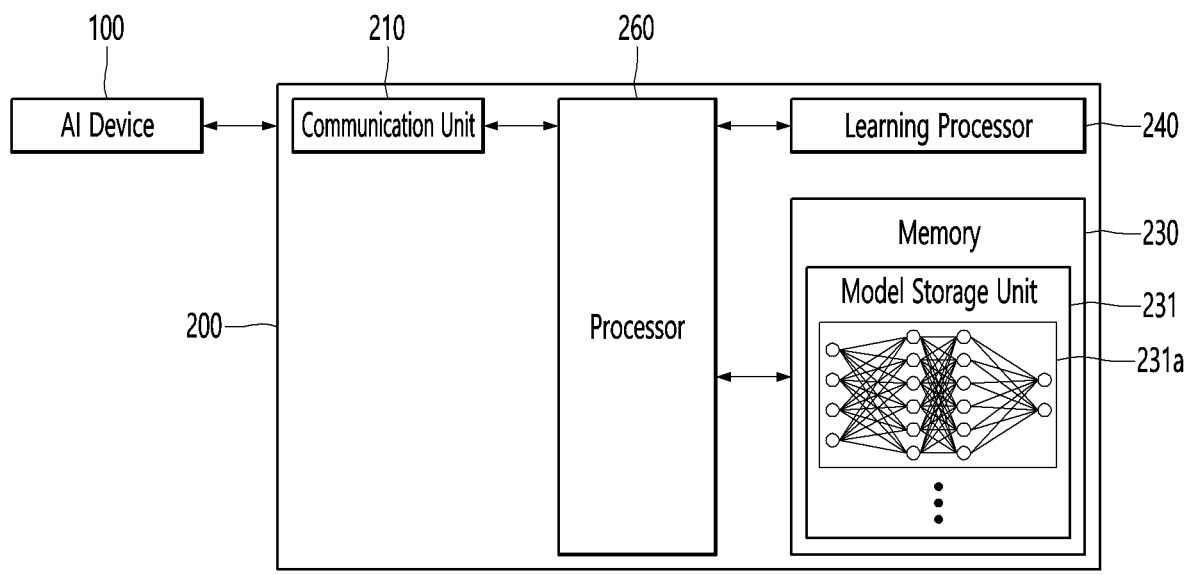
FIG. 2 illustrates an AI server according to an embodiment of the present disclosure.

At this time, the learning processor 130 may perform AI processing together with the learning processor 240 of the AI server 200 of FIG. 2.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in the memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network/The AI server 200 may include a plurality of servers to perform distributed processing or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
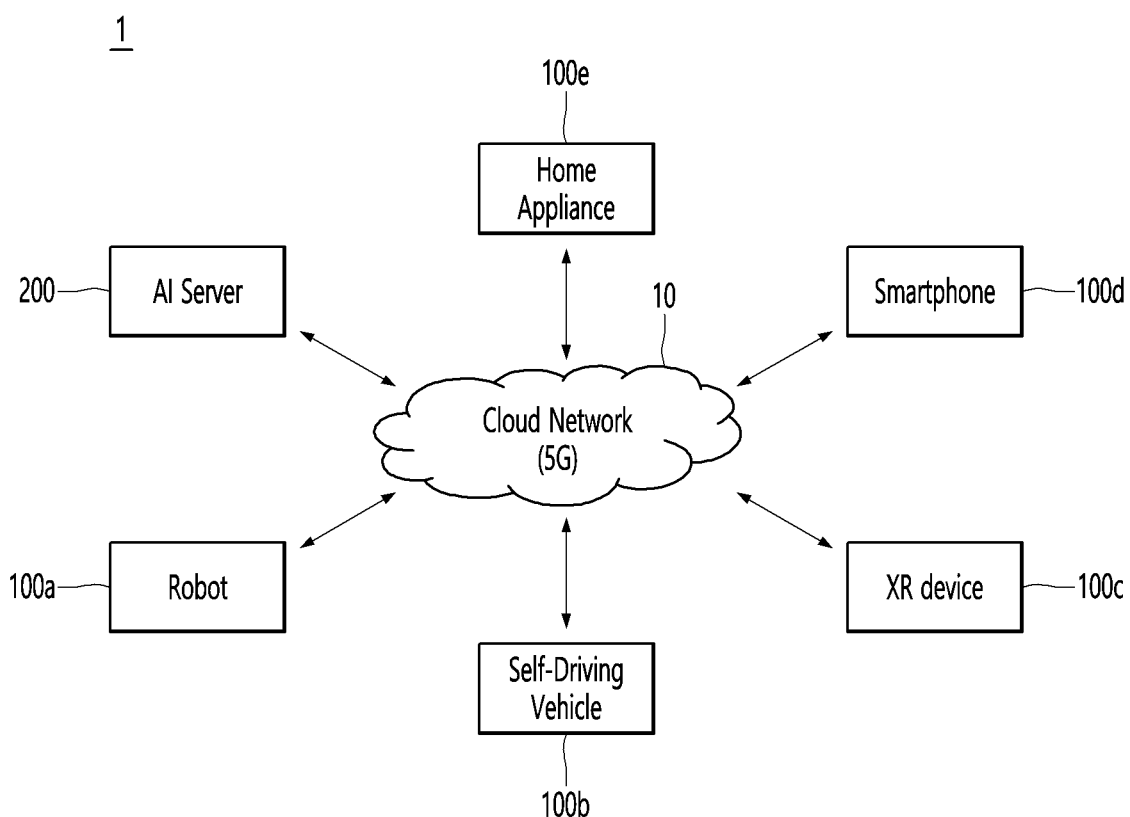
FIG. 3 illustrates an AI system according to an embodiment of the present disclosure.

FIG. 3 is a view of an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the accommodated input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model provided as at least one artificial neural network. For example, the robot 100*a* may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be accommodated to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the path and the travel plan, or may determine the operation.

Like the robot 100a, the self-driving vehicle 100b may use the sensor information acquired from at least one sensor among the lidar, the radar, and the camera so as to determine the travel path and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

In this case, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel path and the travel plan, and may control the driving device such that the self-driving vehicle 100b travels along the determined travel path and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. In this case, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

In this case, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot subjected to control/interaction in an XR image. In this case, the robot 100*a* may be separated from the XR device 100*c* and interwork with each other.

If the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user may confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving vehicle 100*b*, to which the XR technology is applied, may refer to a self-driving vehicle having a means for providing an XR image or a self-driving vehicle subjected to control/interaction in an XR image. Particularly, the self-driving vehicle 100*b* In other words subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

If the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
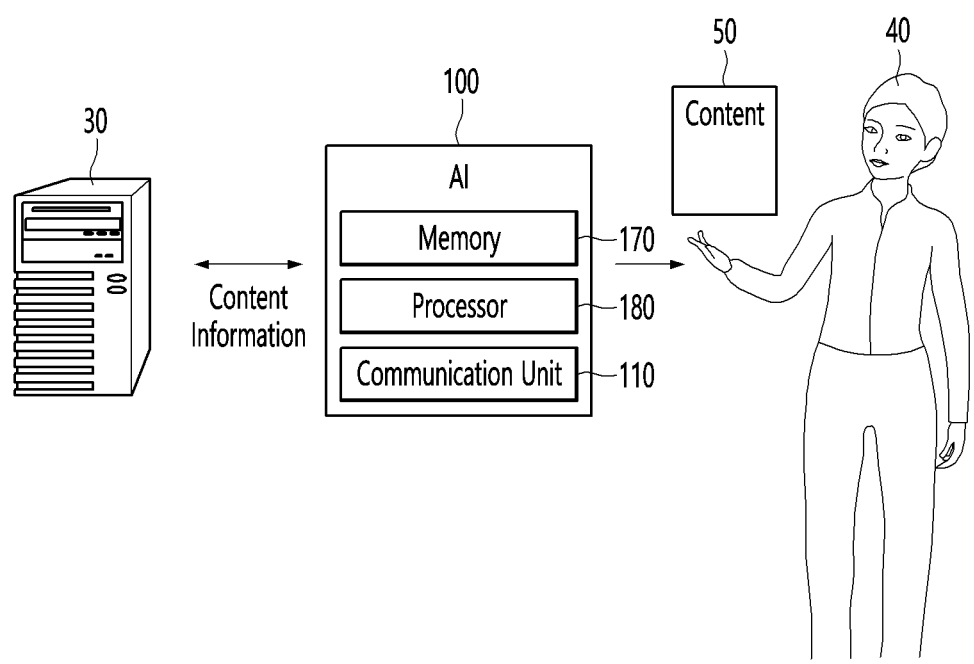
FIG. 4 is a diagram for describing a motion of an AI device according to an embodiment of the present disclosure.

FIG. 4 is a diagram for describing an operation of an AI device according to an embodiment of the present disclosure.

As illustrated in FIG. 4, an AI device 100 of the present disclosure may include a memory 170 that stores a spoken sentence of a 3D agency 40, a processor 180 that controls the motion of the 3D agency 40 in correspondence to the spoken sentence, and a communication unit 110 that receives content information through a communication connection a the server 30.

The processor 180 may be configured to: when the spoken sentence of the 3D agency 40 is generated, extract a keyword of the spoken sentence; acquire related content 50 associated with the keyword of the spoken sentence to detect positions of an object and text in the related content 50; when an object and text corresponding to the keyword of the spoken sentence exist in the related content 50, map the positions of the object and the text corresponding to the keyword of the spoken sentence to 3D coordinates; output the related content 50 to a surrounding space of the 3D agency 40; and control the motion of the 3D agency 40 so that the 3D agency 40 performs an utterance motion corresponding to the spoken sentence and an indication motion of indicating 3D coordinates at which the object and the text of the related content are located.

The processor 180 may be configured to: when the spoken sentence of the 3D agency is generated, generate the 3D agency 40 that conducts a conversation with a user; and when the user is detected, generate the spoken sentence of the 3D agency 40 to be delivered to the user.

For example, when the user is detected, the processor 180 may be configured to confirm whether a spoken sentence generation condition including a plurality of preset spoken sentences and a spoken sentence generation order exists; and when the spoken sentence generation condition exists, sequentially generate the preset spoken sentences in correspondence to the spoken sentence generation order.

As another example, the processor 180 may be configured to: identify the user when the user is detected; confirm whether a personalized spoken sentence generation condition corresponding to the identified user exists; when the personalized spoken sentence condition exists, extract a preset spoken sentence and a spoken sentence generation order to be delivered to the identified user based on the personalized spoken sentence generation condition; and sequentially generate the preset spoken sentences in correspondence to the spoken sentence generation order.

The processor 180 may be configured to: confirm the position of the user when the spoken sentence generation condition does not exist; and generate a spoken sentence associated with a product close to the user based on the position of the user.

In some cases, when the spoken sentence generation condition does not exist, the processor 180 may be configured to acquire product state information from a communicable product and generate a spoken sentence associated with the acquired product state information.

As another example, the processor 180 may be configured to: when the user is detected, acquire state information from a plurality of communicable electronic devices; confirm whether the status information is information that needs to be delivered; and when the state information is information that needs to be delivered, generate a spoken sentence associated with the state information.

Upon confirming whether the status information is information that needs to be delivered, the processor 180 may be configured to: when there is a plurality of state information that needs to be delivered, calculate importance of the plurality of state information; determine priorities of the plurality of state information in correspondence to the importance; and generate the spoken sentences associated with the state information in correspondence to the determined priorities.

In some cases, the processor 180 may be configured to: identify the user when the user is detected; select personalized state information corresponding to the identified user among the plurality of state information acquired from the communicable electronic devices; and generate the spoken sentences associated with the selected personalized state information.

As another example, upon receiving a call command from the sensed user, the processor 180 may be configured to: confirm whether the user inputs a voice command; and when the voice command of the user is input, generate a spoken sentence for responding to the voice command of the user.

The processor 180 may be configured to convert the voice command of the user into text; extract a keyword included in the voice command; and generate a spoken sentence associated with the keyword.

Next, upon generating the 3D agency 40, the processor 180 may be configured to: confirm whether a user-applied target persona to be expressed by the 3D agency 40 exists; identify the user when the user-applied target persona exists; and generate the 3D agency 40 expressing the target persona corresponding to the identified user.

The processor 180 may be configured to generate the 3D agency 40 expressing unique motion features and unique voice features of the target persona.

In some cases, the processor 180 may be configured to generate the 3D agency expressing user-set motion features and user-set voice features of the target persona.

In another case, when the target persona for each user does not exist, the processor 180 may be configured to: select the preset target persona as default; and generate the 3D agency 40 expressing the selected target persona.

In another embodiment, the processor 180 may be configured to: when the spoken sentence of the 3D agency 40 is generated, generate the 3D agency 40 that conducts a conversation with the user; and, when a voice command is input from the user, generates the spoken sentence of the 3D agency 40 for responding to the voice command.

The processor 180 may be configured to convert the voice command of the user into text; extract a keyword included in the voice command; and generate a spoken sentence associated with the keyword.

In addition, upon generating the spoken sentence of the 3D agency 40, the processor 180 may be configured to extract the spoken sentence from the plurality of speech sentences stored in the memory 170 or extract the spoken sentence from the plurality of spoken sentences stored in the external server 30.

Next, upon acquiring related content 50, the processor 180 may be configured to extract an important keyword from the generated spoken sentence; search related content 50 associated with the important keyword; and when the found related content 50 is plural, acquire the related content 50 having the highest association with the spoken sentence.

Upon extracting the important keyword, the processor 180 may be configured to extract important keyword from the spoken sentence based on the frequency at which words in the spoken sentence are connected to other words.

For example, the processor 180 may use a TextRank algorithm to recognize a word having the highest frequency at which a word in the spoken sentence is connected to other words as the important keyword.

In some cases, the processor 180 may be configured to: when searching the related content 50, confirm whether a search condition for the related content 50 exists; and when the search condition for the related content 50 exists, search the related content 50 by limiting a search range corresponding to the search condition.

For example, the search condition may include at least one of a product of a specific company, a product group in a specific field, and a specific function. This is only an embodiment, and the present disclosure is not limited thereto.

As described above, according to the present disclosure, when the search range corresponding to the search condition is limited, the search time for the related content 50 may be minimized and the search accuracy may be increased.

In addition, upon searching the related content 50, the processor 180 may be configured to access an internal server or an external server and search the related content 50 associated with the important keyword of the spoken sentence.

Next, upon detecting the positions of an object and text in the related content 50, the processor 180 may be configured to: when the related content 50 is acquired, determine whether at least one of the object and the text is included in the related content 50; when at least one object is included in the related content 50, detect object position information including position coordinates of the object and the object name corresponding thereto in the related content 50; and when at least one text is included in the related content 50, detect text position information including position coordinates of the text and text corresponding thereto in the related content 50.

Upon detecting the object position information, the processor 180 may be configured to: detect the object included in the related content 50 by using a You Only Look Once (YOLO) algorithm; and extract the position coordinates of the detected object and the object name corresponding thereto.

In some cases, the processor 180 may be configured to: detect objects included in the related content 50 when the object position information is detected; when there are a plurality of detected objects, perform bounding box processing on each object; group the position coordinates and the object name for each bounding box-processed object as a pair; and store a plurality of object position information groups in the memory 170.

In addition, upon detecting the object position information, the processor 180 may be configured to: when the related content 50 is a 2D image, extract 2D coordinates of the object included in the 2D related content and the object name corresponding thereto; and when the related content 50 is a 3D image, extract 3D coordinates of the object included in the 3D related content and the object name corresponding thereto.

Upon detecting the text position information, the processor 180 may be configured to: detect the text included in the related content 50 by using a Optical Character Recognition (OCR) algorithm; and extract the position coordinates of the detected text and the text corresponding thereto.

In some cases, the processor 180 may be configured to: detect texts included in the related content 50 when the text position information is detected; when there are a plurality of detected texts, perform bounding box processing on each character of the text; group the position coordinates and the words for each bounding box-processed text as a pair; and store a plurality of text position information groups in the memory 170.

In addition, upon detecting the text position information, the processor 180 may be configured to: when the related content 50 is a 2D image, extract 2D coordinates of the text included in the 2D related content and the object name corresponding thereto; and when the related content 50 is a 3D image, extract 3D coordinates of the text included in the 3D related content and the text corresponding thereto.

Next, upon mapping the object position and the text position to 3D coordinates, the processor 180 may be configured to: when a plurality of objects are detected in the related content 50, confirm whether the same object as the keyword of the spoken sentence exists; when the same object as the keyword of the spoken sentence exists, extract position coordinates of the same object as the keyword of the spoken sentence; and when the extracted position coordinates of the object are 2D coordinates, map 2D coordinates of the object to 3D coordinates.

When the extracted position coordinates of the object are 3D coordinates, the processor 180 may omit the 3D coordinate mapping process.

Next, upon mapping the object position and the text position to 3D coordinates, the processor 180 may be configured to: when a plurality of texts are detected in the related content 50, confirm whether the same text as the keyword of the spoken sentence exists; when the same text as the keyword of the spoken sentence exists, extract position coordinates of the same text as the keyword of the spoken sentence; and when the extracted position coordinates of the text are 2D coordinates, map 2D coordinates of the text to 3D coordinates.

When the extracted position coordinates of the text are 3D coordinates, the processor 180 may omit the 3D coordinate mapping process.

Next, upon mapping the object position and the text position to 3D coordinates, the processor 180 may be configured to: when a plurality of objects are detected in the related content 50, determine similarity between the keyword of the spoken sentence and the plurality of objects; extract the position coordinates of the object having the highest similarity to the keyword of the spoken sentence; and when the extracted position coordinates of the object are 2D coordinates, map the 2D coordinates of the object to 3D coordinates.

When the extracted position coordinates of the object are 3D coordinates, the processor 180 may omit the 3D coordinate mapping process.

Next, upon mapping the object position and the text position to 3D coordinates, the processor 180 may be configured to: when a plurality of texts are detected in the related content 50, confirm similarity between the keyword of the spoken sentence and the plurality of texts; extract the position coordinates of the text having the highest similarity to the keyword of the spoken sentence; and when the extracted position coordinates of the text are 2D coordinates, map the 2D coordinates of the text to 3D coordinates.

When determining the similarity, the processor 180 may be configured to: vectorize the words of the text and the keyword of the spoken sentence by using a word-to-vector (Word2Vec) algorithm; and determine the similarity based on a vector value between the words of the text and the keyword of the spoken sentence.

In addition, when the extracted position coordinates of the text are 3D coordinates, the processor 180 may omit the 3D coordinate mapping process.

Next, upon mapping the object position and the text position to 3D coordinates, the processor 180 may be configured to: when a plurality of objects are detected in the related content 50, confirm whether the same object as the keyword of the spoken sentence exists; when the same object as the keyword of the spoken sentence does not exist, determine similarity between the keyword of the spoken sentence and the plurality of objects; extract position coordinates of the object having the highest similarity to the keyword of the spoken sentence; and when the extracted position coordinates of the object are 2D coordinates, map the 2D coordinates of the object to 3D coordinates.

In some cases, upon mapping the object position and the text position to 3D coordinates, the processor 180 may be configured to: when a plurality of texts are detected in the related content 50, confirm whether the same text as the keyword of the spoken sentence exists; when the same text as the keyword of the spoken sentence does not exist, determine similarity between the keyword of the spoken sentence and the plurality of texts; extract position coordinates of the text having the highest similarity to the keyword of the spoken sentence; and when the extracted position coordinates of the text are 2D coordinates, map the 2D coordinates of the text to 3D coordinates.

Next, upon outputting the related content 50, the processor 180 may be configured to: when a specific object of the related content 50 is mapped to 3D coordinates, output the related content 50 so that the 3D position point of the specific object is located around the upper body of the 3D agency; and when the specific text of the related content 50 is mapped to 3D coordinates, output the related content so that the 3D position point of the specific text is located around the upper body of the 3D agency.

The processor 180 may be configured to adjust the distance between the 3D position point of the specific object or the specific text and the upper body of the 3D agency 40 in consideration of the length of the arm of the 3D agency 40.

For example, when the arm of the 3D agency 40 is long, the processor 180 may be configured to increase the distance between the 3D position point of the specific object or the specific text and the upper body of the 3D agency 40. For example, when the arm of the 3D agency 40 is short, the processor 180 may be configured to decrease the distance between the 3D position point of the specific object or the specific text and the upper body of the 3D agency 40.

Next, upon outputting the related content 50, the processor 180 may be configured to, when the 3D agency 40 starts an utterance motion corresponding to the spoken sentence, output related content 50 including at least one of the object and the keyword corresponding to the keyword of the spoken sentence.

Next, upon controlling the motion of the 3D agency 40, the processor 180 may be configured to, when the related content 50 is output, control the motion of the 3D agency 40 so that the hand position of the 3D agency 40 moves to the 3D position point of the specific object or the specific text of the related content 50.

Upon controlling the motion of the 3D agency 40, the processor 180 may be configured to: extract 3D rotation parameter of each joint of the 3D agency 40 by using a control rig algorithm; and control the motion of the 3D agency 40 so that the 3D agency 40 indicates the 3D position point of the specific object or the specific text of the related content 50 based on the 3D rotation parameter of each joint.

In addition, upon controlling the motion of the 3D agent 40, the processor 180 may be configured to, when the hand position of the 3D agency 40 moves to the 3D position point of the specific object or the specific text of the related content 50, control the motion of the 3D agency 40 so that a face direction and an eye's gaze direction of the 3D agency 40 are directed to the 3D position point of the specific object or the specific text of the related content 50.

In some cases, when the hand position of the 3D agency 40 moves to the 3D position point of the specific object or the specific text of the related content 50, the processor 180 may be configured to highlight the specific object or the specific text of the related content 50.

In another case, upon controlling the motion of the 3D agency 40, the processor 180 may be configured to, when the related content 50 including a specific object moving in a specific direction is output, control the motion of the 3D agency 40 so that the hand motion of the 3D agency 40 rotates in the same direction as the specific direction of the specific object.

On the other hand, in the present disclosure, when the 3D agency 40 is generated, a 2D image including a target persona may be acquired. The 2D image may be pre-processed to extract a training dataset including voice information, face information, and motion information corresponding to the target persona. The training dataset may be input to the agency generation model to learn the motion features of the target persona. When user input data for generating the 3D agency is received, The user input data may be input to the pre-trained agency generation model to generate the 3D agency 40 expressing the motion features of the target persona.

In the present disclosure, upon pre-processing the 2D image, it may be confirmed whether a pre-selected target persona is included in the 2D image. When the target persona is included in the 2D image, an identification code may be assigned to the target persona included in the 2D image. The training dataset including the voice information, the face information, and the motion information corresponding to the target persona to which the identification code is assigned may be extracted. The training dataset may be stored in the memory 170 for each identification code of the target persona.

In the present disclosure, when the motion features of the target persona are learned, the dataset including identification code, voice information, face information, motion information, text information, and special motion feature information corresponding to the target persona may be input to the agency generation model, and the voice of the target persona may be learned based on the identification code and the text information. The face motion of the target persona may be based on the identification code, the voice information, and the face information. 3D rotation parameters of joints corresponding to the target persona may be learned based on the identification code, the voice information, and the motion information. The unique specific motion of the target persona may be learned based on the identification code and the special motion feature information.

The agency generation model may include a TTS model that learns the voice of the target persona based on the identification code and the text information, a face motion model that learns the face motion of the target persona based on the identification code, the voice information, and the face information, a body motion model that learns 3D rotation parameters of joints corresponding to the target persona based on the identification code, the voice information, and the motion information, and a special motion feature model that learns a unique specific motion of the target persona based on the identification code and the special motion feature information.

Next, in the present disclosure, upon generating the 3D agency 40, the processor 180 may be configured to: check whether user input data includes identification code, audio-related basic data, and motion control level if user input data for generation of the 3D agency is received; input the user input data including the identification code, the audio-related basic data, and the motion control level to the pre-trained agency generation model to output the voice, face motion, and body motion of the target persona; and generate the 3D agency 40 expressing user-applied general voice features and unique motion features of the target persona based on the voice, face motion, and body motion.

In some cases, in the present disclosure, upon generating the 3D agency 40, the processor 180 may be configured to: confirm whether user input data includes identification code, text, and motion control level if user input data for generation of the 3D agency is received; input the user input data including the identification code, the text, and the motion control level to the pre-trained agency generation model to output the voice, face motion, and body motion of the target persona; and generate the 3D agency 40 expressing the unique motion features of the target persona and unique voice features based on the voice, face motion, and body motion.

As described above, in the present disclosure, the motion of the 3D agency may be controlled so that the 3D agency indicates the specific position of the 3D content corresponding to the spoken sentence, thereby providing a 3D content service that gives customers various interests and fun.

In addition, in the present disclosure, the 3D agency expressing the unique specific motion of the target persona may be generated to provide interest and fun to customers.

In addition, in the present disclosure, the 3D agency expressing not only the unique voice of the target persona but also the user-applied voice may be generated to provide various services to customers.

Figure 5:
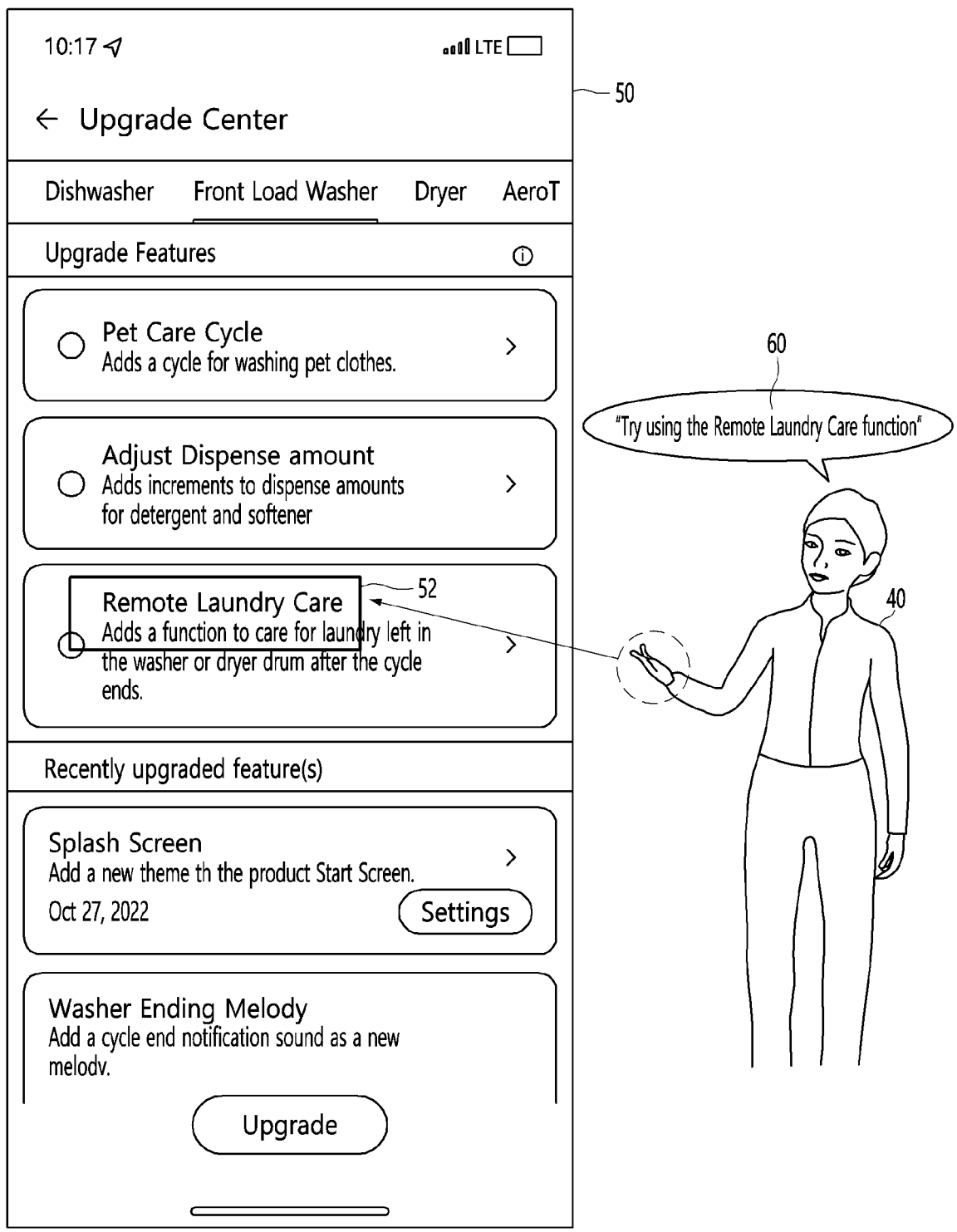
FIGS. 5 and 6 are diagrams for describing a process of controlling a 3D agency motion in the AI device according to an embodiment of the present disclosure.
Figure 6:
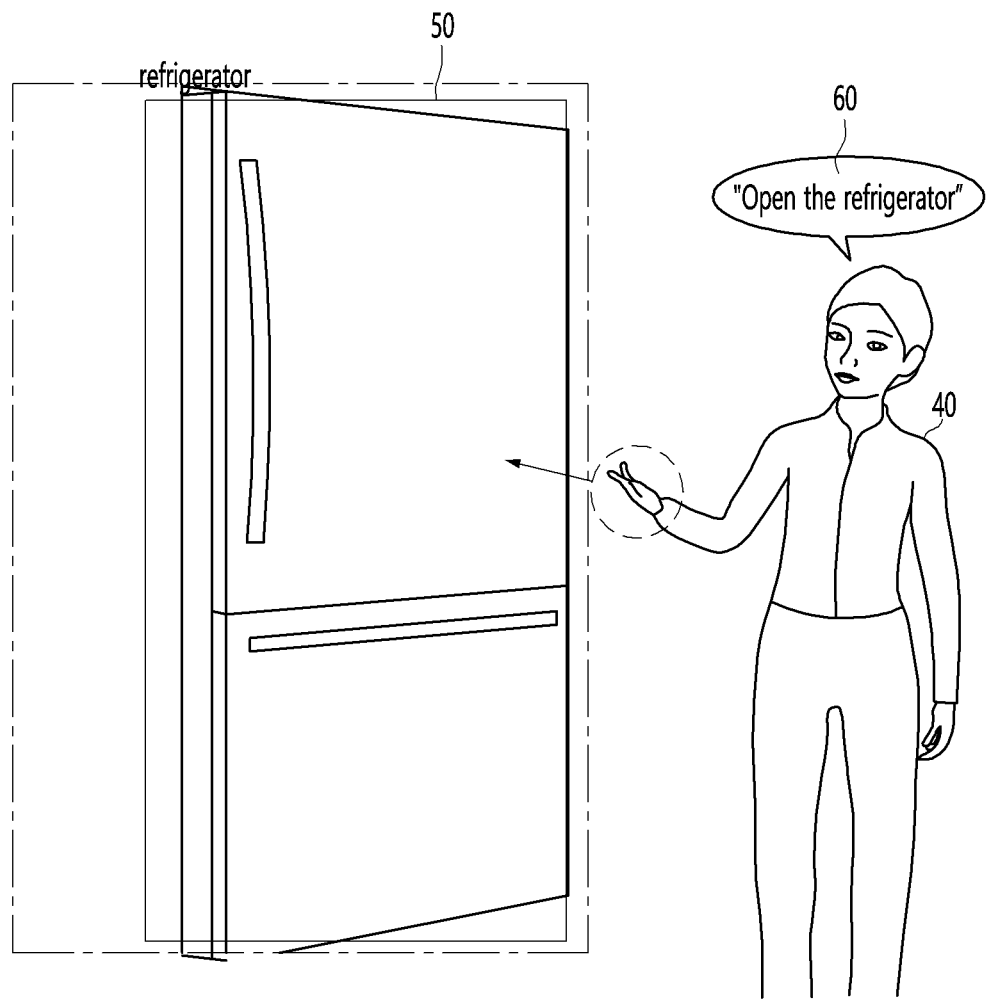

FIGS. 5 and 6 are diagrams for describing a process of controlling the 3D agency motion in the AI device according to an embodiment of the present disclosure.

As illustrated in FIG. 5, in the present disclosure, a 3D agency 40 may be generated and a spoken sentence 60 of the 3D agency 40 may be generated.

For example, in the present disclosure, when the spoken sentence 60 of the 3D agency 40 is generated as "Try using the Remote Laundry Care function", "Remote Laundry Care", which is an important keyword, may be extracted from the spoken sentence 60.

In the present disclosure, related content 50 associated with the important keyword may be searched and the related content 50 having the highest association with the important keyword of the spoken sentence may be acquired.

For example, in the present disclosure, a function update guide of a product including a "remote laundry care function" may be acquired as the related content 50.

Next, in the present disclosure, the position of the text in the related content 50 may be detected, and it may be determined whether text 52 corresponding to the keyword of the spoken sentence exists in the related content 50.

For example, in the present disclosure, it may be determined whether the text "Remote Laundry Care" corresponding to the keyword of the spoken sentence or the text having a high similarity exists in the related content 50.

Next, in the present disclosure, when the text 52 corresponding to the keyword of the spoken sentence exists, the 2D position of the corresponding text may be mapped to 3D coordinates.

In the present disclosure, the related content 50 may be output to the surrounding space of the 3D agency 40, and the motion of the 3D agency 40 may be controlled so that the 3D agency 40 performs an utterance motion corresponding to the spoken sentence 60 and an indication motion of indicating the 3D coordinates at which the text 52 of the related content 50 is located.

In the present disclosure, when the related content 50 is output, the motion of the 3D agency 40 may be controlled so that the hand position of the 3D agency 40 moves to the 3D position point of the text 52 of the related content 50.

In some cases, in the present disclosure, when the hand position of the 3D agency 40 moves to the 3D position point of the text 52 of the related content 50, the motion of the 3D agency 40 may be controlled so that the face direction and the eye's gaze direction of the 3D agency 40 are directed to the 3D position point of the text 52 of the related content 50.

In another case, in the present disclosure, the text 52 of the related content 50 may be highlighted when the hand position of the 3D agency 40 moves to the 3D position point of the text 52 of the related content 50.

As illustrated in FIG. 6, in the present disclosure, the 3D agency 40 may be generated and the spoken sentence 60 of the 3D agency 40 may be generated.

For example, in the present disclosure, when the spoken sentence 60 of the 3D agency 40 is generated as "Open the refrigerator", the important keyword "refrigerator" may be extracted from the spoken sentence 60.

In the present disclosure, related content 50 associated with the important keyword may be searched and the related content 50 having the highest association with the important keyword of the spoken sentence may be acquired.

For example, in the present disclosure, a "refrigerator" related product may be acquired as the related content 50.

Next, in the present disclosure, the position of the object in the related content 50 may be detected, and it may be determined whether an object corresponding to the keyword of the spoken sentence exists in the related content 50.

For example, in the present disclosure, it may be determined whether the object "refrigerator" corresponding to the keyword of the spoken sentence or the object having a high similarity exists in the related content 50.

Next, in the present disclosure, when the object corresponding to the keyword of the spoken sentence exists, the 2D position of the corresponding text may be mapped to 3D coordinates.

In the present disclosure, the related content 50 may be output to the surrounding space of the 3D agency 40, and the motion of the 3D agency 40 may be controlled so that the 3D agency 40 performs an utterance motion corresponding to the spoken sentence 60 and an indication motion of indicating the 3D coordinates at which the object of the related content 50 is located.

In the present disclosure, when the related content 50 is output, the motion of the 3D agency 40 may be controlled so that the hand position of the 3D agency 40 moves to the 3D position point of the object of the related content 50.

In some cases, in the present disclosure, when the hand position of the 3D agency 40 moves to the 3D position point of the object of the related content 50, the motion of the 3D agency 40 may be controlled so that the face direction and the eye's gaze direction of the 3D agency 40 are directed to the 3D position point of the object of the related content 50.

In another case, in the present disclosure, the object of the related content 50 may be highlighted when the hand position of the 3D agency 40 moves to the 3D position point of the object of the related content 50.

Figure 7:
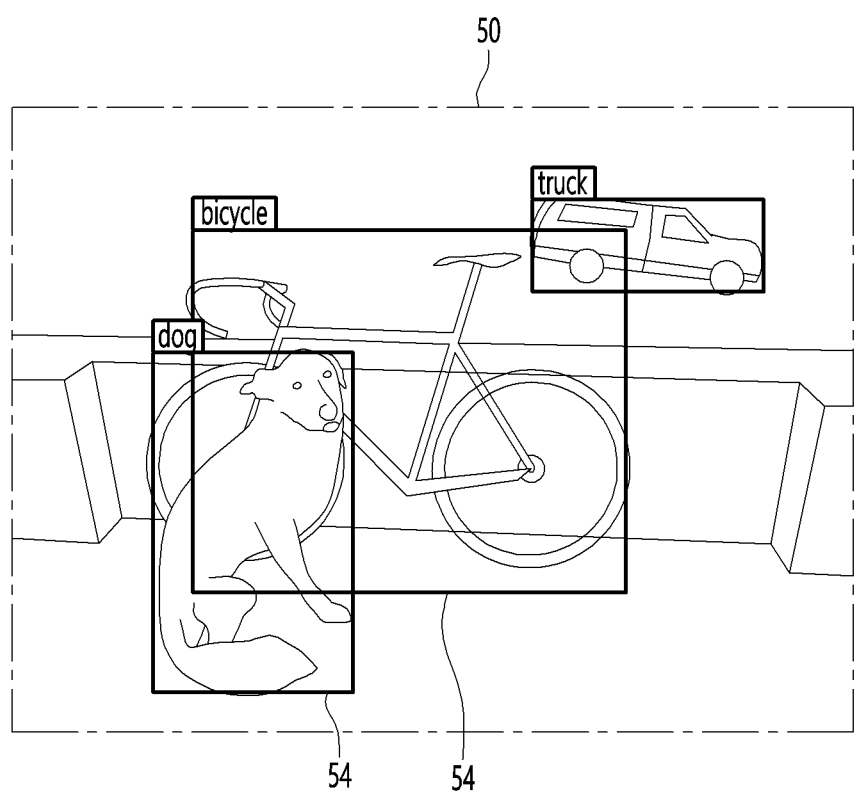
FIG. 7 is a diagram for describing a process of detecting a position of an object in related content in the AI device according to an embodiment of the present disclosure.

FIG. 7 is a diagram for describing a process of detecting a position of an object in related content in the AI device according to an embodiment of the present disclosure.

As illustrated in FIG. 7, in the present disclosure, when related content 50 is acquired, it may be determined whether an object 54 is included in the related content 50. When at least one object 54 is included in the related content 50, object position information including the position coordinates of the object 54 and the name of the object 54 corresponding thereto may be detected in the related content 50.

In the present disclosure, upon detecting the object position information, the object 54 included in the related content 50 may be detected by using a You Only Look Once (YOLO) algorithm, and the position coordinates of the detected object 54 and the name of the object 54 corresponding thereto may be extracted.

In some cases, in the present disclosure, objects 54 included in the related content 50 may be detected when the object position information is detected. When there are a plurality of detected objects, bounding box processing may be performed on each object. The position coordinates and the object name for each bounding box-processed object may be grouped as a pair. A plurality of object position information groups may be stored in the memory 170.

In addition, when the related content 50 is a 2D image, 2D coordinates of the object 54 included in the 2D related content and the name of the object 54 corresponding thereto may be extracted. When the related content 50 is a 3D image, 3D coordinates of the object 54 included in the 3D related content and the name of the object 54 corresponding thereto may be extracted.

Figure 8:
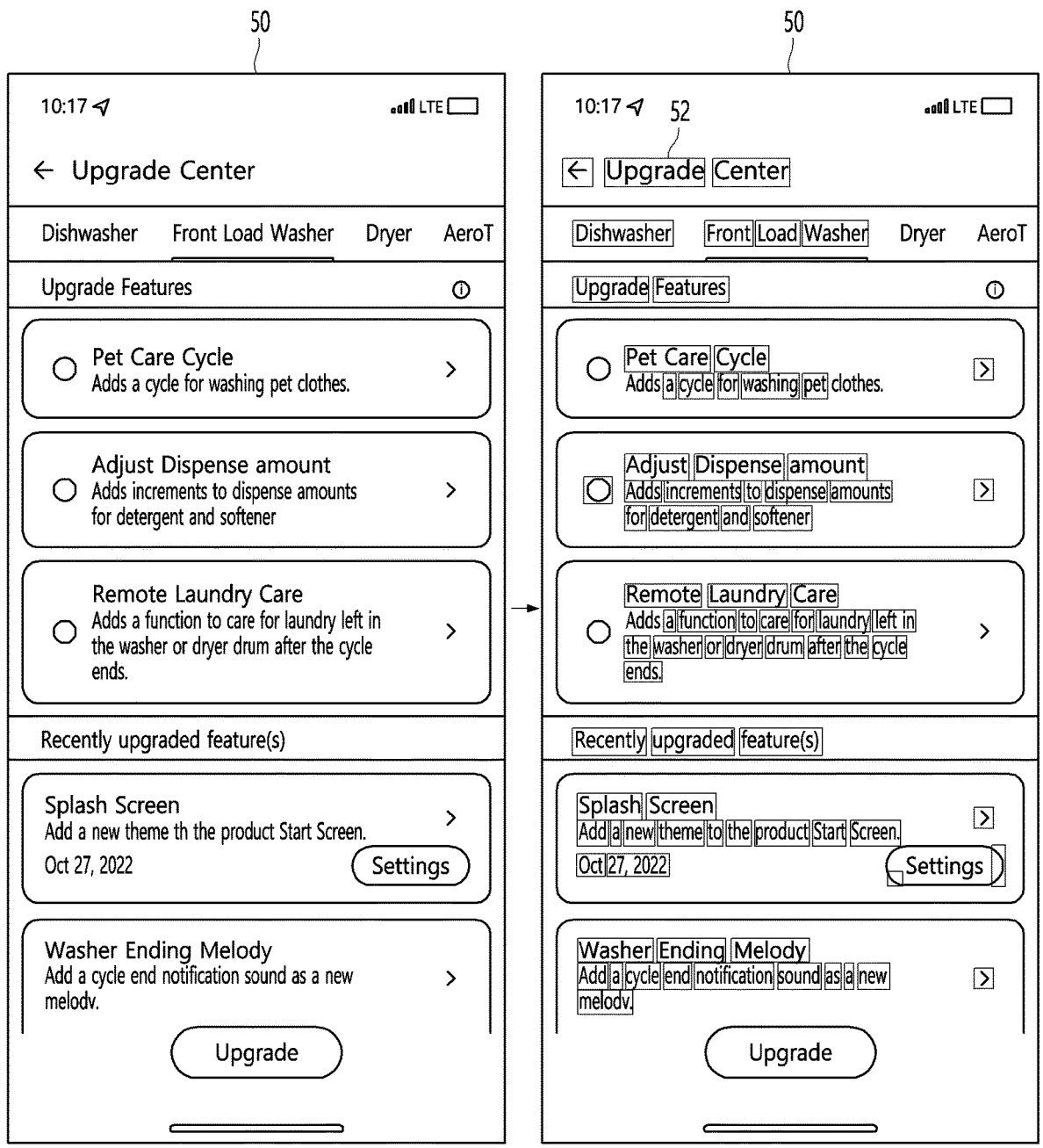
FIG. 8 is a diagram for describing a process of detecting a position of text in related content in the AI device according to an embodiment of the present disclosure.

FIG. 8 is a diagram for describing a process of detecting a position of text in related content in the AI device according to an embodiment of the present disclosure.

As illustrated in FIG. 8, in the present disclosure, when related content 50 is acquired, it may be determined whether text 52 is included in the related content 50. When at least one text 52 is included in the related content 50, text position information including the position coordinates of the text 52 and the name of the text 52 corresponding thereto may be detected in the related content 50.

In the present disclosure, upon detecting the text position information, the text 52 included in the related content 50 may be detected by using an Optical Character Recognition (OCR) algorithm, and the position coordinates of the detected text 52 and the name of the text 52 corresponding thereto may be extracted.

In some cases, in the present disclosure, texts 52 included in the related content 50 may be detected when the text position information is detected. When there are a plurality of detected texts 52, bounding box processing may be performed on each character of the text. The position coordinates for each word of the bounding box-processed text and the corresponding word may be grouped as a pair. A plurality of text position information groups may be stored in the memory.

In addition, upon detecting the text position information, when the related content 50 is a 2D image, 2D coordinates of the text 52 included in the 2D related content and the text corresponding thereto may be extracted. When the related content 50 is a 3D image, 3D coordinates of the text included in the 3D related content and the text corresponding thereto may be extracted.

Figure 9:
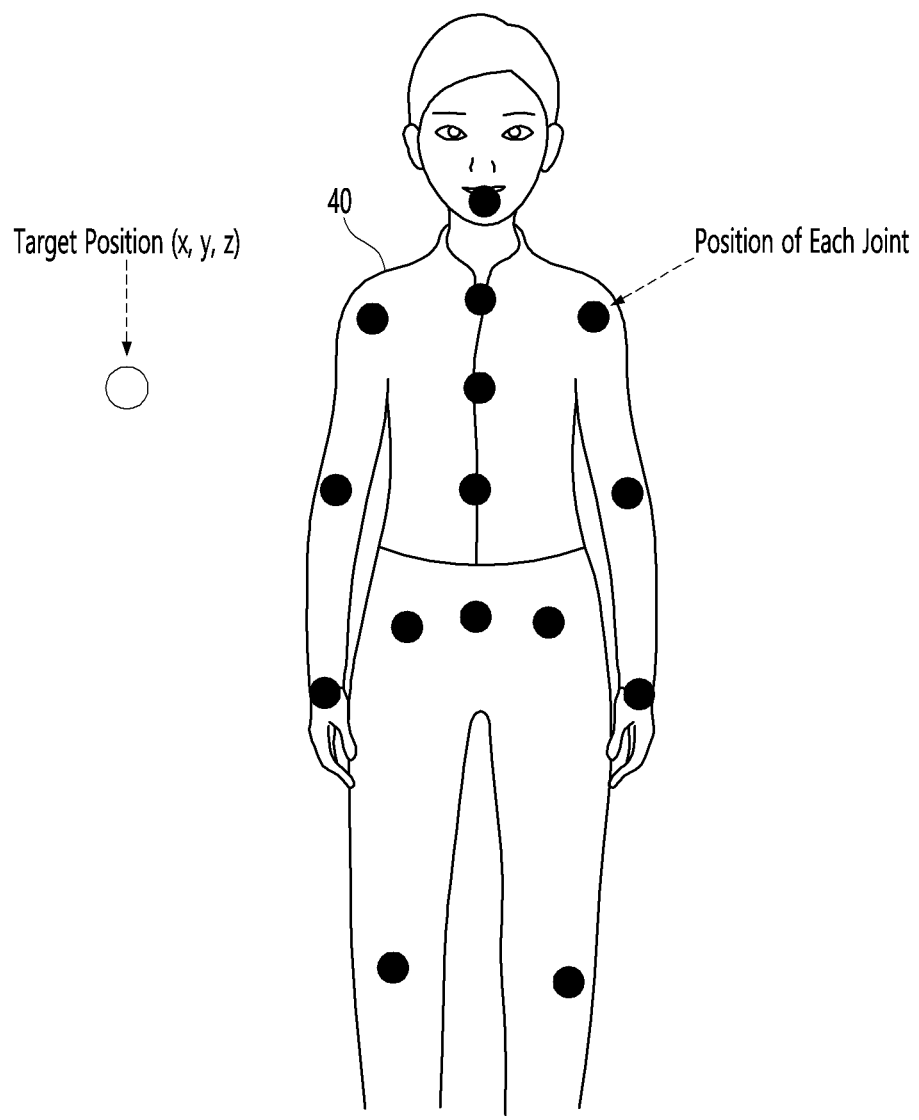
FIGS. 9 and 10 are diagrams for describing a process of moving a hand position of a 3D agency to a target position in the AI device according to an embodiment of the present disclosure.
Figure 10:
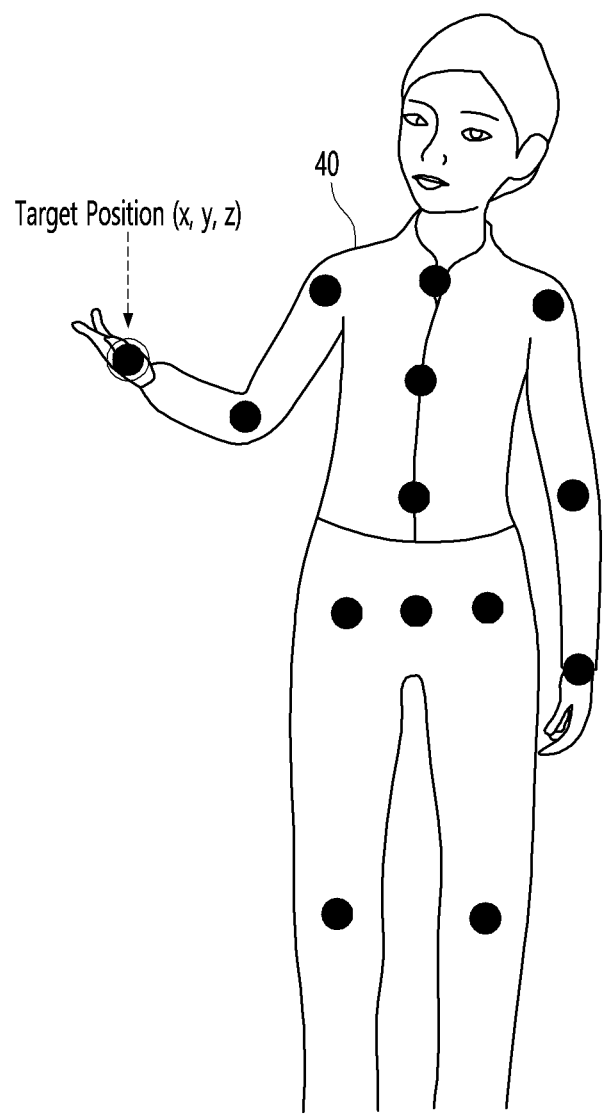

FIGS. 9 and 10 are diagrams for describing a process of moving a hand position of a 3D agency to a target position in the AI device according to an embodiment of the present disclosure.

As illustrated in FIGS. 9 and 10, in the present disclosure, when a specific text or a specific object having a high similarity to a keyword of a spoken sentence is included in related content, position coordinates of the specific text and the specific object may be extracted, and the corresponding position coordinates may be mapped to 3D coordinates.

As illustrated in FIG. 9, in the present disclosure, when a 3D position point for the specific text or the specific object of the related content is (x, y, z), the motion of the 3D agency 40 may be controlled so that the hand position of the 3D agency 40 moves to the 3D position point (x, y, z) of the specific object or the specific text of the related content, as illustrated in FIG. 10.

In the present disclosure, 3D rotation parameter of each joint of the 3D agency 40 may be extracted by using a control rig algorithm, and the motion of the 3D agency 40 may be controlled so that the 3D agency indicates the 3D position point of the specific object or the specific text of the related content based on the 3D rotation parameter of each joint.

In addition, in the present disclosure, when the hand position of the 3D agency 40 moves to the 3D position point (x, y, z) of the specific object or the specific text of the related content 50, the motion of the 3D agency 40 may be controlled so that the face direction and the eye's gaze direction of the 3D agency 40 are directed to the 3D position point (x, y, z) of the specific object or the specific text of the related content.

In some cases, in the present disclosure, when the hand position of the 3D agency 40 moves to the 3D position point (x, y, z) of the specific object or the specific text of the related content 50, the specific object or the specific text of the related content may be highlighted.

Figure 11:
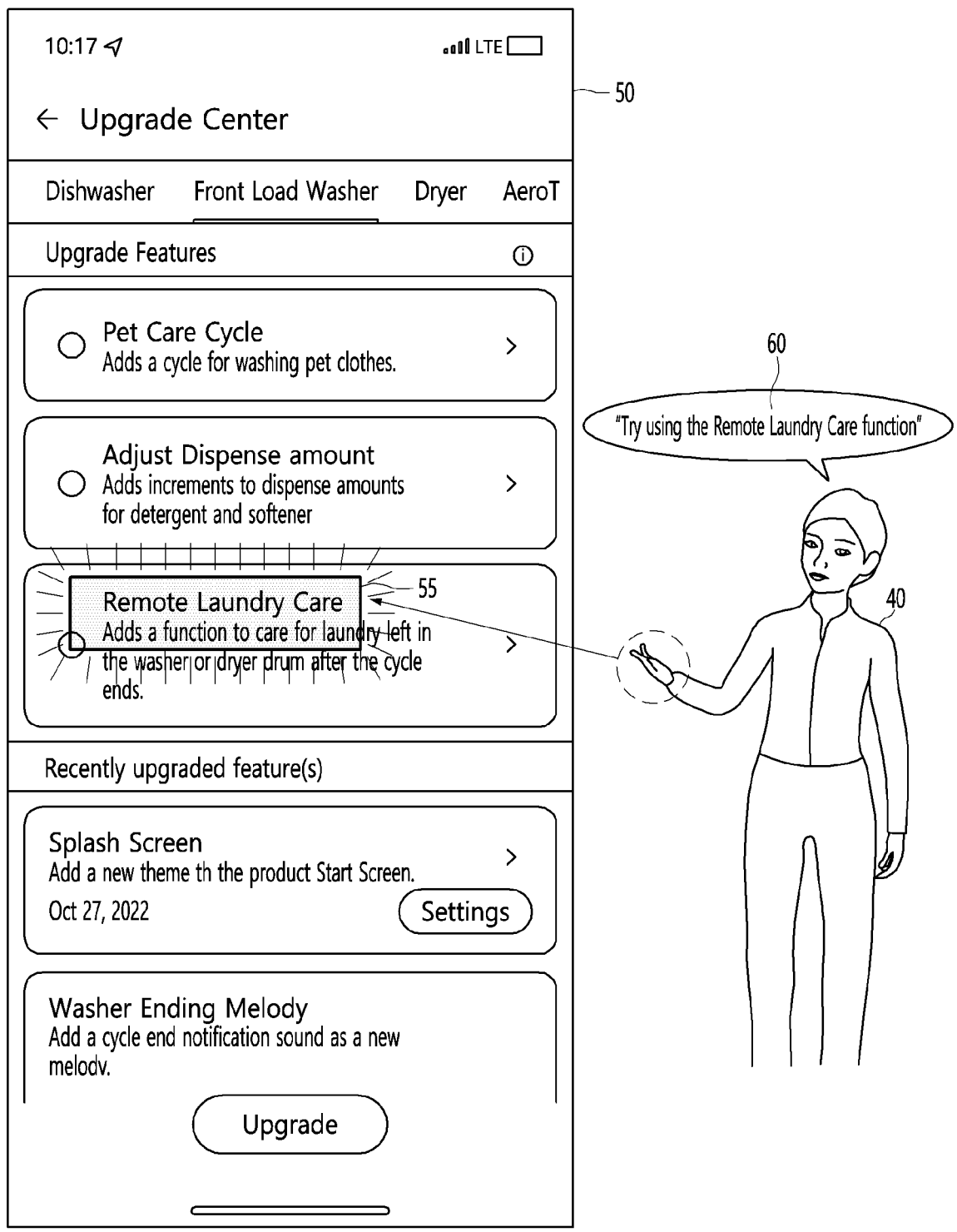
FIGS. 11 to 13 are diagrams for describing a process of highlighting a specific object or a specific text of related content in the AI device according to an embodiment of the present disclosure.
Figure 12:
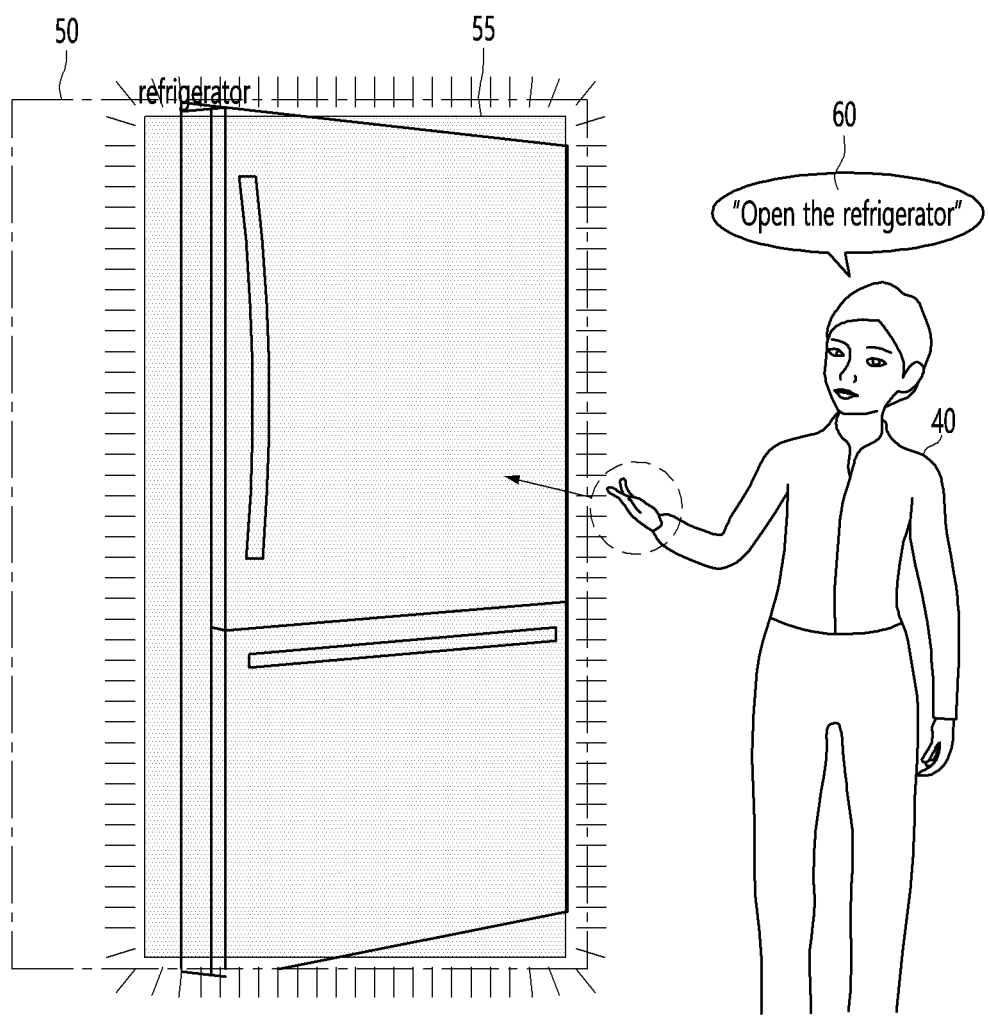
Figure 13:
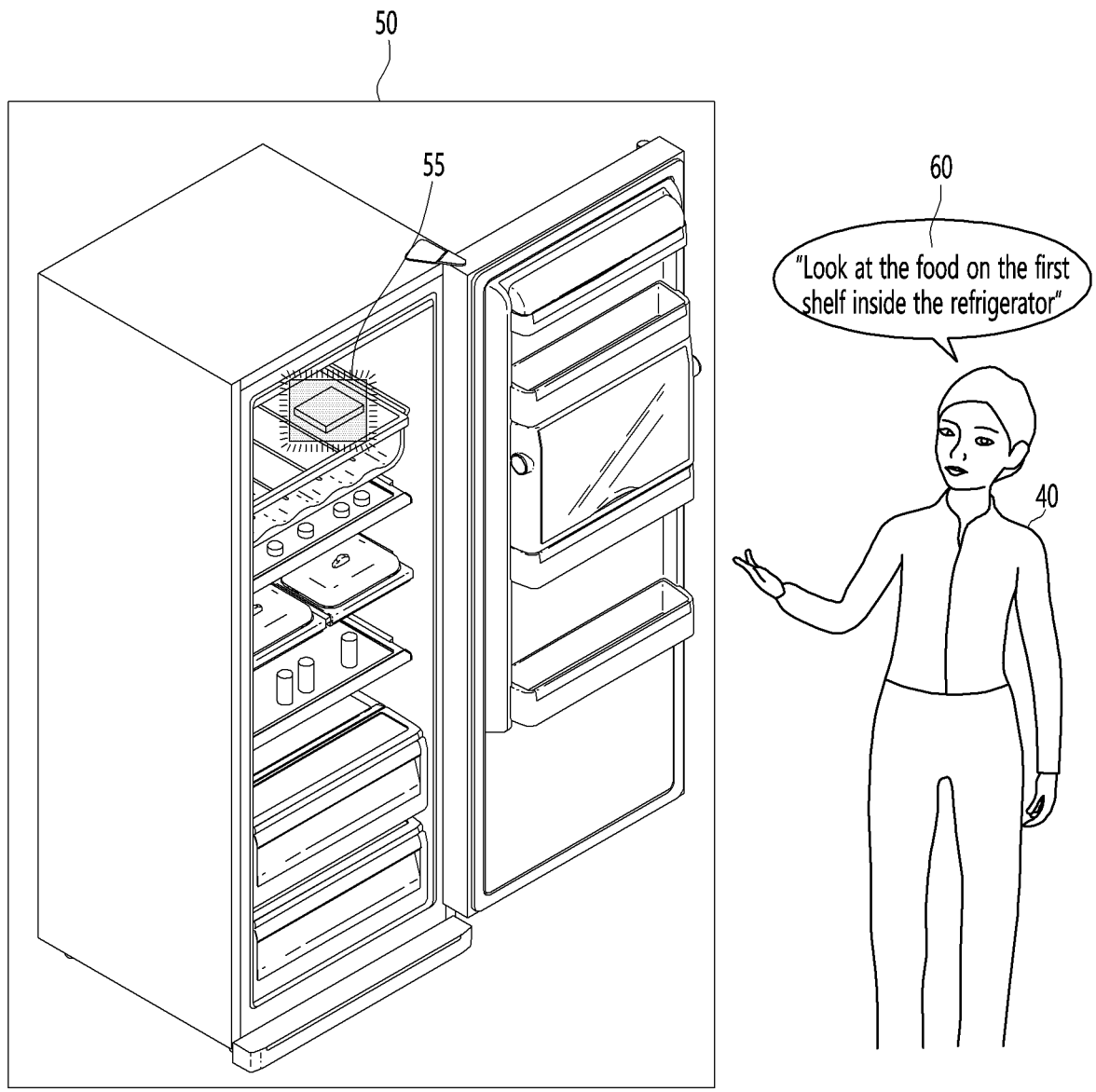

FIGS. 11 to 13 are diagrams for describing a process of highlighting a specific object or a specific text of related content in the AI device according to an embodiment of the present disclosure.

As illustrated in FIG. 11, in the present disclosure, a 3D agency 40 may be generated, and a spoken sentence 60 of the 3D agency 40 "Try using the Remote Laundry Care function" may be generated.

In the present disclosure, "Remote Laundry Care", which is an important keyword, may be extracted from the spoken sentence 60, and a function update guide of a product including the "Remote Laundry Care function" may be acquired as the related content 50.

Next, in the present disclosure, a position of a text may be detected in the related content 50, and it may be determined whether a text "Remote Laundry Care" corresponding to the keyword of the spoken sentence or a text having a high similarity exists in the related content 50.

Next, in the present disclosure, when the text corresponding to the keyword of the spoken sentence exists, the 2D position of the corresponding text may be mapped to 3D coordinates.

In the present disclosure, when the related content 50 is output to the surrounding space of the 3D agency 40, the motion of the 3D agency 40 may be controlled so that the hand position of the 3D agency 40 moves to the 3D position point of the text of the related content 50.

In the present disclosure, the text of the related content 50 may be highlighted when the hand position of the 3D agency 40 moves to the 3D position point of the text 52 of the related content 50.

As illustrated in FIG. 12, in the present disclosure, the 3D agency 40 may be generated and the spoken sentence 60 of the 3D agency 40 "Open the refrigerator" may be generated.

In the present disclosure, "refrigerator", which is an important keyword, may be extracted from the spoken sentence 60. A product related to the important keyword "refrigerator" may be searched in the related content 50 and a product related to the "refrigerator" may be acquired as the related content 50.

Next, in the present disclosure, when a refrigerator, which is an object corresponding to the keyword of the spoken sentence, exists in the related content 50, the 2D position of the corresponding object may be mapped to 3D coordinates.

In the present disclosure, when the related content 50 is output to the surrounding space of the 3D agency 40, the motion of the 3D agency 40 may be controlled so that the hand position of the 3D agency 40 moves to the 3D position point of the object of the related content 50.

In the present disclosure, the object of the related content 50 may be highlighted when the hand position of the 3D agency 40 moves to the 3D position point of the object of the related content 50.

As illustrated in FIG. 13, in the present disclosure, the 3D agency 40 may be generated, and may be generated as the spoken sentence 60 "Look at the food on the first shelf inside the refrigerator".

In the present disclosure, "inside the refrigerator", "first shelf", and "food", which are the important keyword, may be extracted from the spoken sentence 60. A product showing the inside of the refrigerator may be searched in the related contents 50 based on the important keyword "inside the refrigerator", and a product related to the "inside the refrigerator" may be acquired as the related contents 50.

Next, in the present disclosure, when a refrigerator, which is an object corresponding to the keyword of the spoken sentence, exists in the related content 50, the 2D position of the corresponding object may be mapped to 3D coordinates.

In the present disclosure, when the related content 50 is output to the surrounding space of the 3D agency 40, the motion of the 3D agency 40 may be controlled so that the hand position of the 3D agency 40 moves to the 3D position point corresponding to the "food on the first shelf inside the refrigerator" of the related content 50.

In the present disclosure, when the hand position of the 3D agency 40 moves to the 3D position point corresponding to "food on the first shelf inside the refrigerator" of the related content 50, the food, which is the object of the related content 50, may be highlighted (55).

Figure 14:
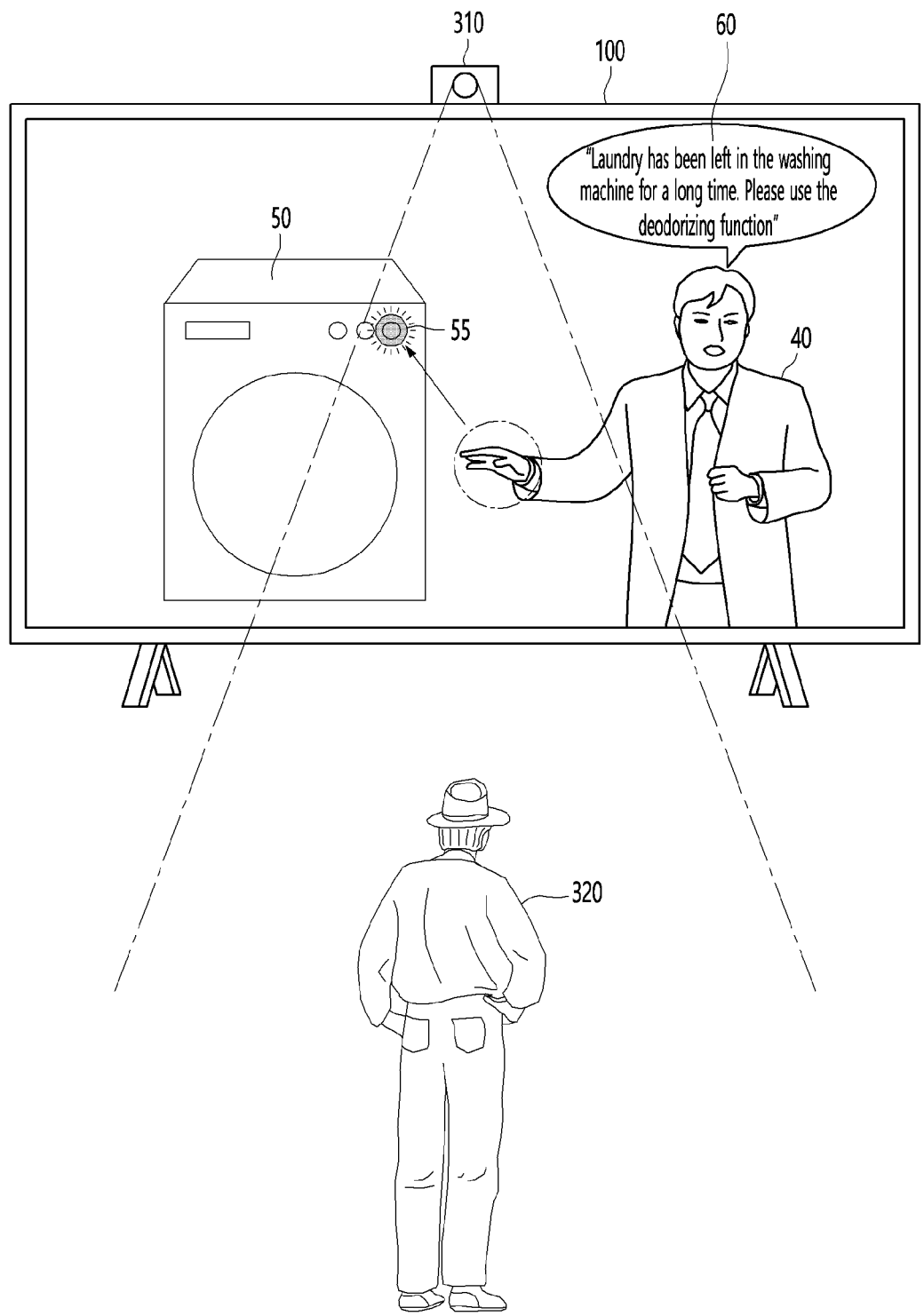
FIGS. 14 and 15 are diagrams for describing a personalization process of a 3D agency in the AI device according to an embodiment of the present disclosure.
Figure 15:
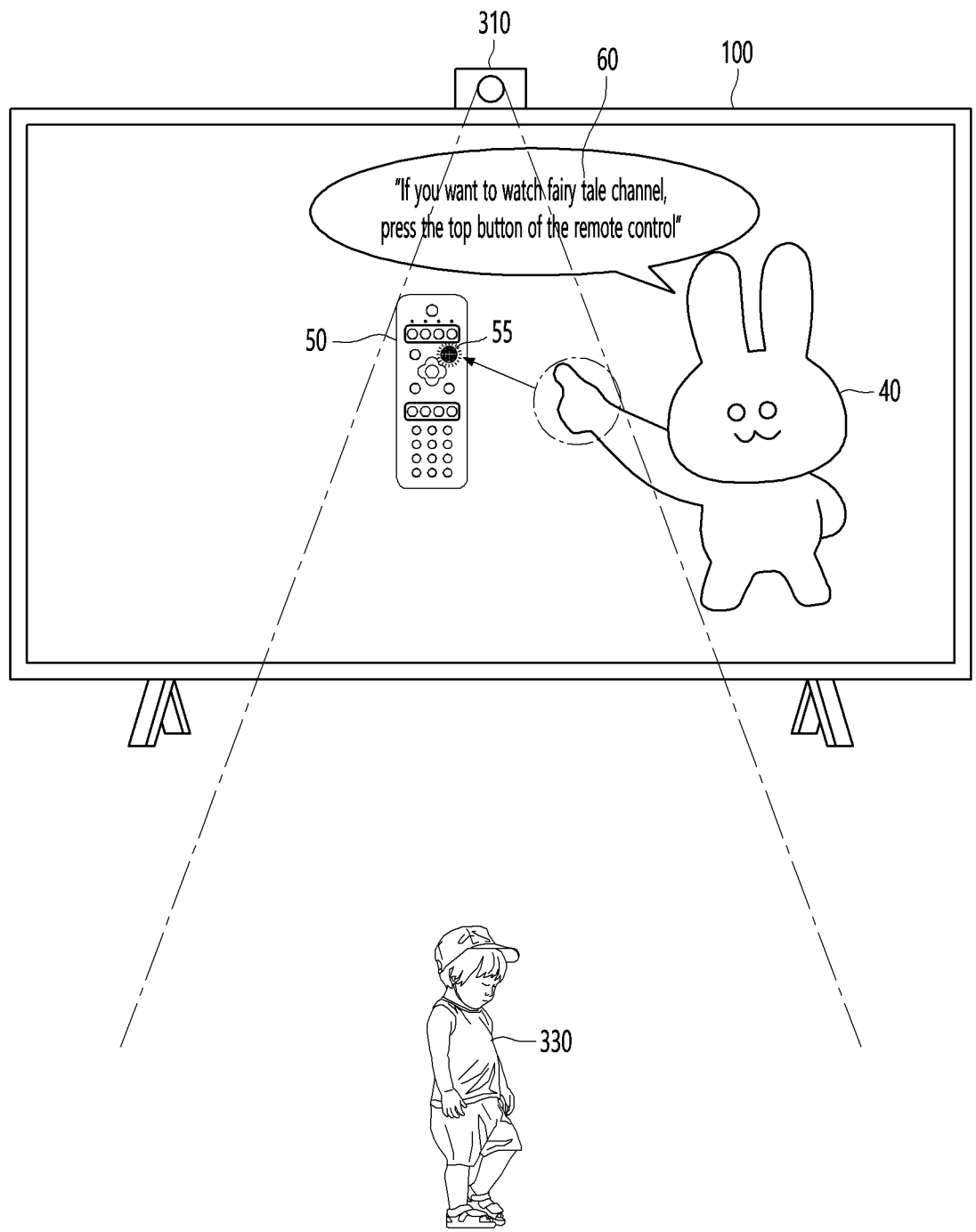

FIGS. 14 and 15 are diagrams for describing a personalization process of a 3D agency in the AI device according to an embodiment of the present disclosure.

As illustrated in FIGS. 14 and 15, in the present disclosure, it may be determined whether there is a target persona for each user to be expressed by the 3D agency 40. When the target persona for each user exists, the user may be identified through the camera 310 of the display device 100.

In the present disclosure, the 3D agency 40 expressing the target persona corresponding to the identified user may be generated.

In the present disclosure, the 3D agency 40 expressing unique motion features and unique voice features of the target persona may be generated.

In some cases, in the present disclosure, the 3D agency expressing user-set motion features and user-set voice features of the target persona may be generated.

In another case, in the present disclosure, when the target persona for each user does not exist, the preset target persona may be selected as default, and the 3D agency 40 expressing the selected target persona may be generated.

As an example, as illustrated in FIG. 14, in the present disclosure, when the identified user is a father 320, a target persona matching the father 320 may be searched. When the target persona matching the father 320 is a specific celebrity, the 3D agency 40 expressing the target persona corresponding to the specific celebrity may be generated.

Next, in the present disclosure, a spoken sentence to be delivered to the father 320 may be generated, and related content corresponding to a keyword of the spoken sentence may be acquired.

For example, when the spoke sentence 60 of the 3D agency 40 is "Laundry has been left in the washing machine for a long time. Please use the deodorizing function", the related content 50 associated with the "deodorizing function of the washing machine," which is an important keyword of the spoken sentence 60, may be acquired.

In the present disclosure, when there is the deodorizing function of the washing machine corresponding to the keyword of the spoken sentence in the related contents 50, a 2D position of a corresponding deodorizing function button may be mapped to 3D coordinates.

In the present disclosure, when the related content 50 is output to the surrounding space of the 3D agency 40, the motion of the 3D agency 40 may be controlled so that the hand position of the 3D agency 40 moves to the 3D position point corresponding to the "deodorizing function of the washing machine" of the related content 50.

In the present disclosure, when the hand position of the 3D agency 40 moves to the 3D position point corresponding to the "deodorizing function button of the washing machine" of the related content 50, the food, which is the object of the related content 50, may be highlighted (55).

As described above, in the present disclosure, when the user is a father 320, the spoken sentence to be delivered to the father 320 may be generated, and then, the 3D agency 40 expressing unique feature motion and unique voice of the target persona corresponding to the specific celebrity may be generated.

As another example, as illustrated in FIG. 15, in the present disclosure, when the identified user is a child 330, a target persona matching the child 330 is searched. When the target persona matching the child 330 is an animal character, the 3D agency 40 expressing the target persona corresponding to the corresponding animal character may be generated.

Next, in the present disclosure, a spoken sentence to be delivered to the child 330 may be generated, and related content corresponding to a keyword of the spoken sentence may be acquired.

For example, when the spoken sentence 60 of the 3D agency 40 is "If you want to watch fairy tale channel, press the top button of the remote control", the related content 50 associated with the "top button of the remote controller", which is an important keyword of the spoken sentence 60, may be acquired.

Next, in the present disclosure, when the top button of the remote controller corresponding to the keyword of the spoken sentence exists in the related content 50, the 2D position of the corresponding top button may be mapped to 3D coordinates.

In the present disclosure, when the related content 50 is output to the surrounding space of the 3D agency 40, the motion of the 3D agency 40 may be controlled so that the hand position of the 3D agency 40 moves to the 3D position point corresponding to the "top button of the remote controller" of the related content 50.

In the present disclosure, when the hand position of the 3D agency 40 moves to the 3D position point corresponding to the "top button of the remote controller" of the related content 50, the food, which is the object of the related content 50, may be highlighted (55).

As described above, in the present disclosure, when the user is a child 330, the spoken sentence to be delivered to the child 330 may be generated, and then, the 3D agency 40 expressing unique feature motion and user-applied voice of the target persona corresponding to the animal character may be generated.

Figure 16:
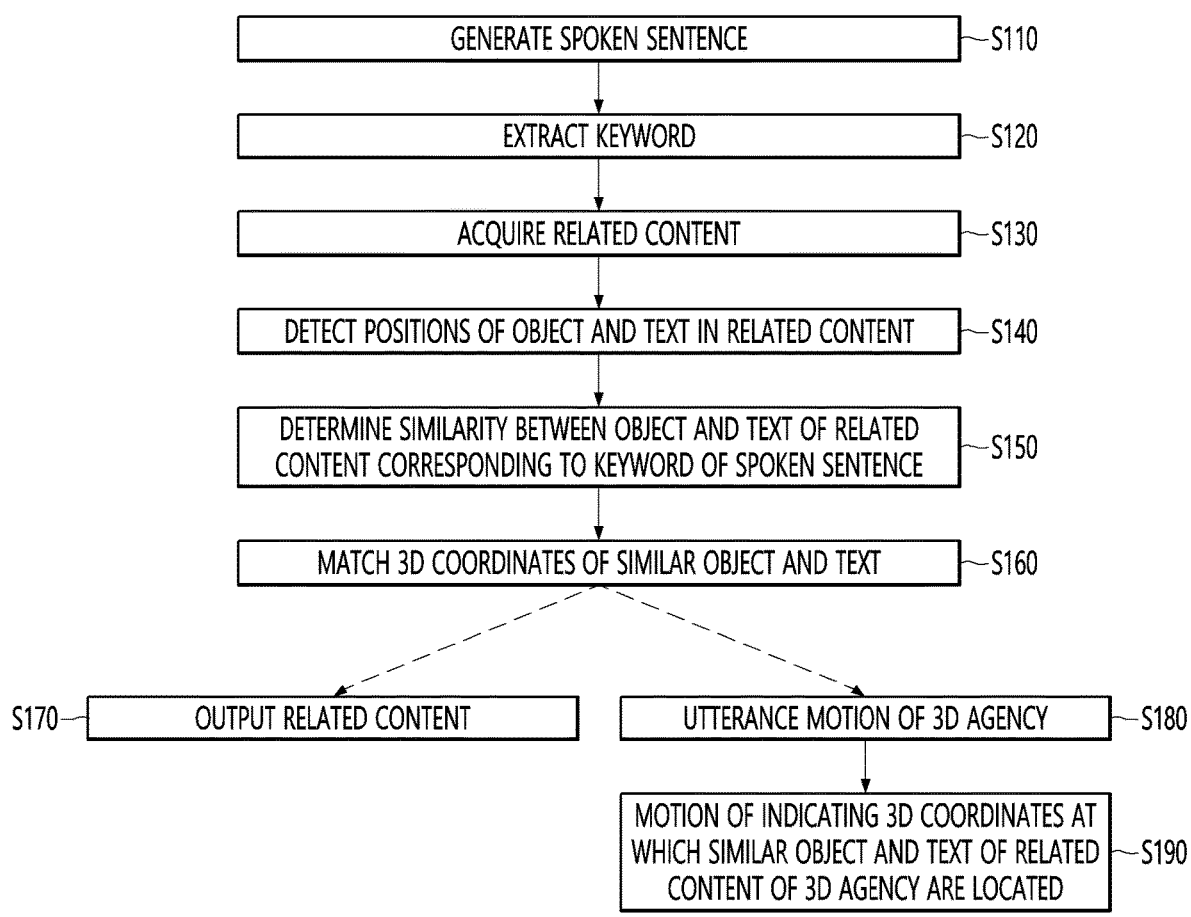
FIG. 16 is a diagram for describing a 3D agency motion controlling method of the AI device according to an embodiment of the present disclosure.

FIG. 16 is a diagram for describing a 3D agency motion controlling method of the AI device according to an embodiment of the present disclosure.

As illustrated in FIG. 16, in the present disclosure, a spoken sentence of a 3D agency may be generated (S110).

In the present disclosure, a 3D agency that conducts a conversation with a user may be generated. When the user is detected, a spoken sentence of the 3D agency to be delivered to the user may be generated.

In some cases, in the present disclosure, a 3D agency that conducts a conversation with a user may be generated. When a voice command is input from the user, a spoken sentence of the 3D agency to respond to the voice command may be generated.

In the present disclosure, a keyword of the spoken sentence may be extracted (S120).

In the present disclosure, an important keyword may be extracted from the spoken sentence based on a frequency at which words in the spoken sentence are connected to other words.

For example, in the present disclosure, a TextRank algorithm may be used to recognize a word having the highest frequency at which a word in the spoken sentence is connected to other words as the important keyword.

Next, in the present disclosure, related content associated with the keyword of the spoken sentence may be acquired (S130).

Next, in the present disclosure, the position of the object and the position of the text in the related content may be detected (S140).

In the present disclosure, when the related content is acquired, it is determined whether at least one of the object and the text is included in the related content. When at least one object is included in the related content, object position information including position coordinates of the object and the name of the object corresponding thereto may be detected from the related content. When at least one text is included in the related content, text position information including position coordinates of the text and the text corresponding thereto may be detected from the related content.

For example, in the present disclosure, the object included in the related content may be detected by using a You Only Look Once (YOLO) algorithm, and position coordinates of the detected object and the name of the object corresponding thereto may be extracted.

As another example, in the present disclosure, the text included in the related content may be detected by using an Optical Character Recognition (OCR) algorithm, and position coordinates of the detected text and the text corresponding thereto may be extracted.

In the present disclosure, similarity between the object and text of the related content and the keyword of the spoken sentence may be determined (S150).

In the present disclosure, similarity between a plurality of texts and keywords of the spoken sentence may be determined, and similarity between a plurality of texts and keywords of the spoken sentence may be determined.

As an example, in the present disclosure, the words of the text and the keywords of the spoken sentence may be vectorized by using a Word2Vec algorithm, and similarity may be determined based on a vector value between the word of the text and the keyword of the spoken sentence.

Next, in the present disclosure, the positions of the object and the text similar to the keyword of the spoken sentence may be mapped to 3D coordinates (S160).

In the present disclosure, the position coordinates of the text and the position coordinates of the object having the highest similarity to the keyword of the spoken sentence may be extracted. When the extracted position coordinates of the text and the object are 2D coordinates, the 2D coordinates of the text and the object may be mapped to 3D coordinates.

Next, in the present disclosure, the related content may be output to the surrounding space of the 3D agency (S170).

In the present disclosure, when a specific object of related content is mapped to 3D coordinates, related content may be output so that a 3D position point of the specific object is located around the upper body of the 3D agency. When a specific text of related content is mapped to 3D coordinates, related content may be output so that a 3D position point of the specific text is located around the upper body of the 3D agency.

In the present disclosure, the motion of the 3D agency may be controlled so that the 3D agency performs an utterance motion corresponding to the spoken sentence (S180) and an indication motion of indicating the 3D coordinates at which the object and the text of the related content are located (S190).

In the present disclosure, when related content is output, the motion of the 3D agency may be controlled so that the hand position of the 3D agency moves to the specific object of the related content or the 3D position point of the specific text.

As an example, in the present disclosure, the 3D rotation parameter of each joint of the 3D agency may be extracted by using a control rig algorithm. The motion of the 3D agency may be controlled so that the 3D agency indicates the 3D position point of the specific object or the specific text of the related content based on the 3D rotation parameter of each joint.

In addition, in the present disclosure, when the hand position of the 3D agency is moved to the 3D position point of the specific object or the specific text of the related content, the motion of the 3D agency may be controlled so that the face direction and the eye's gaze direction of the 3D agency are directed toward the specific object of the related content or the 3D position point of the specific text.

In addition, in the present disclosure, when the hand position of the 3D agency is moved to the 3D position point of the specific object or the specific text of the related content, the specific object or the specific text of the related content may be highlighted.

In addition, in the present disclosure, when the related content including a specific object moving in a specific direction is output, the motion of the 3D agency may be controlled so that the hand motion of the 3D agency rotates in the same direction as the specific direction of the specific object.

Figure 17:
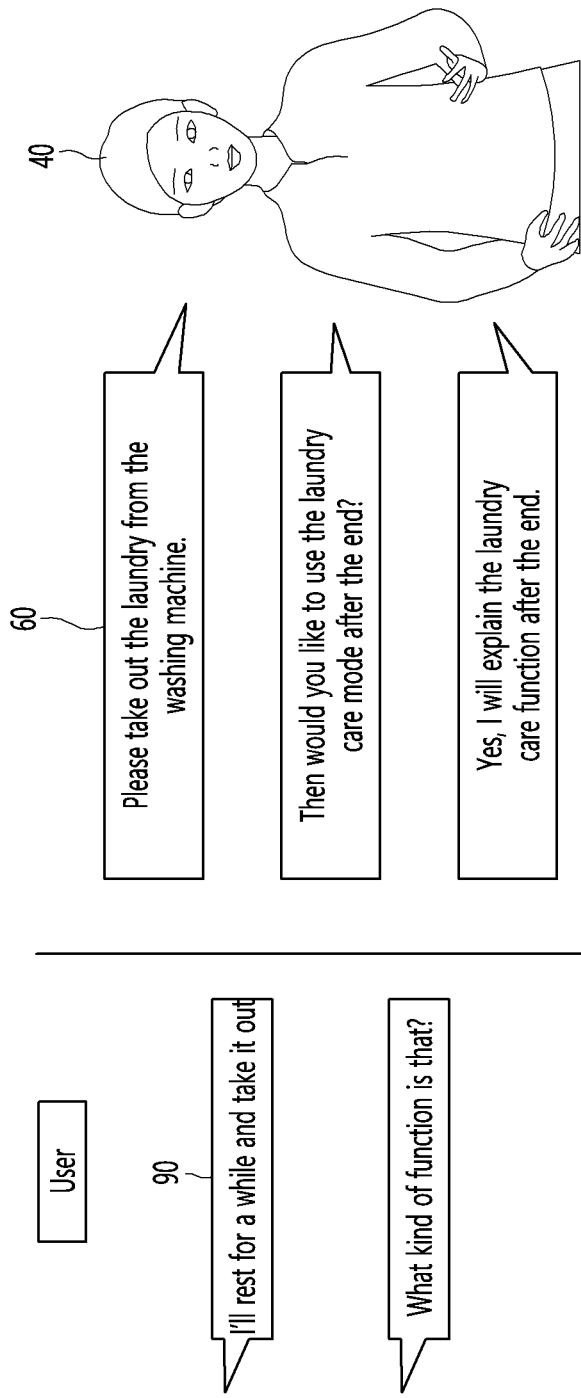
FIGS. 17 and 22 are diagrams for describing implementation of a motion of a 3D agency motion in the AI device according to an embodiment of the present disclosure.
Figure 22:
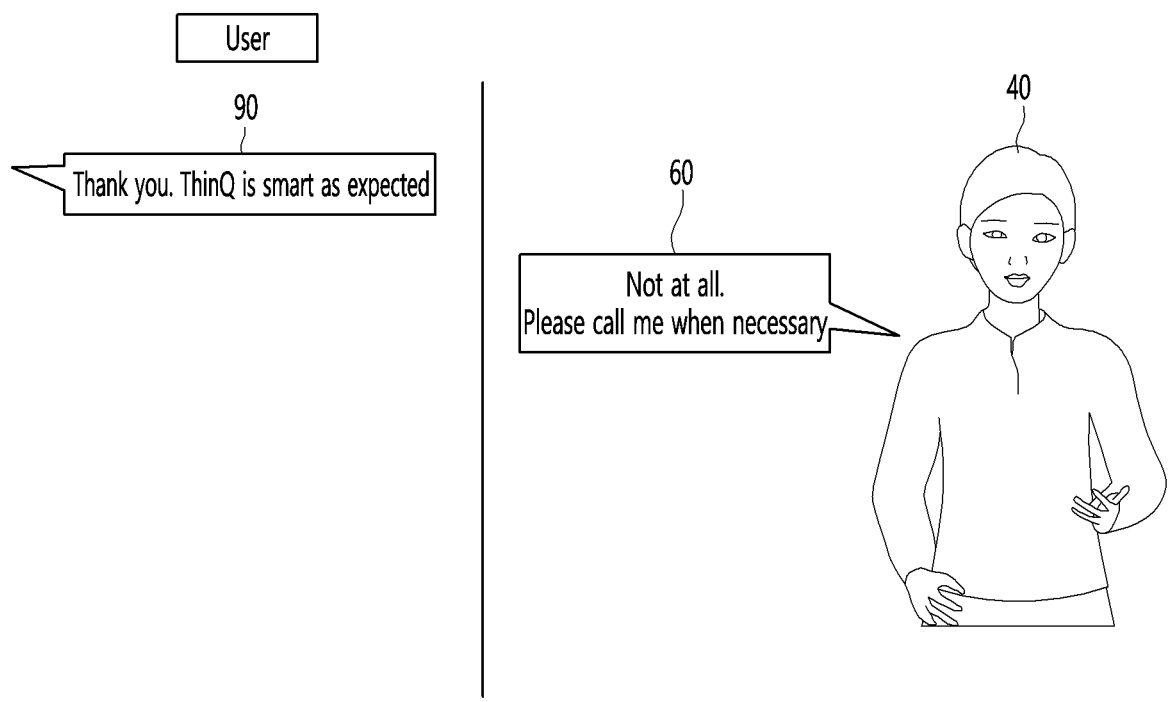

FIGS. 17 and 22 are diagrams for describing implementation of the motion of the 3D agency motion in the AI device according to an embodiment of the present disclosure.

As illustrated in FIG. 17, in the present disclosure, when the user is detected, the 3D agency 40 may be generated and the spoken sentence 60 of the 3D agency 40 may be generated.

In the present disclosure, when the user is detected, the utterance motion of the 3D agency 40 may be controlled to utter the spoken sentence 60 to be delivered to the user.

For example, the 3D agency 40 may perform the utterance motion of the spoken sentence 60 "Please take out the laundry from the washing machine. If the laundry is left for a long time, it may become wrinkled and smell."

Next, when the user utters "I'll rest for a while and take it out" (90), the 3D agency 40 may perform the utterance motion of the spoken sentence 60 "Then would you like to use the laundry care mode after the end?".

Next, when the user utters "What kind of function is that?", the 3D agency 40 may perform the utterance motion of the spoken sentence 60 "Yes, I will explain the laundry care function after the end."

Figure 18:
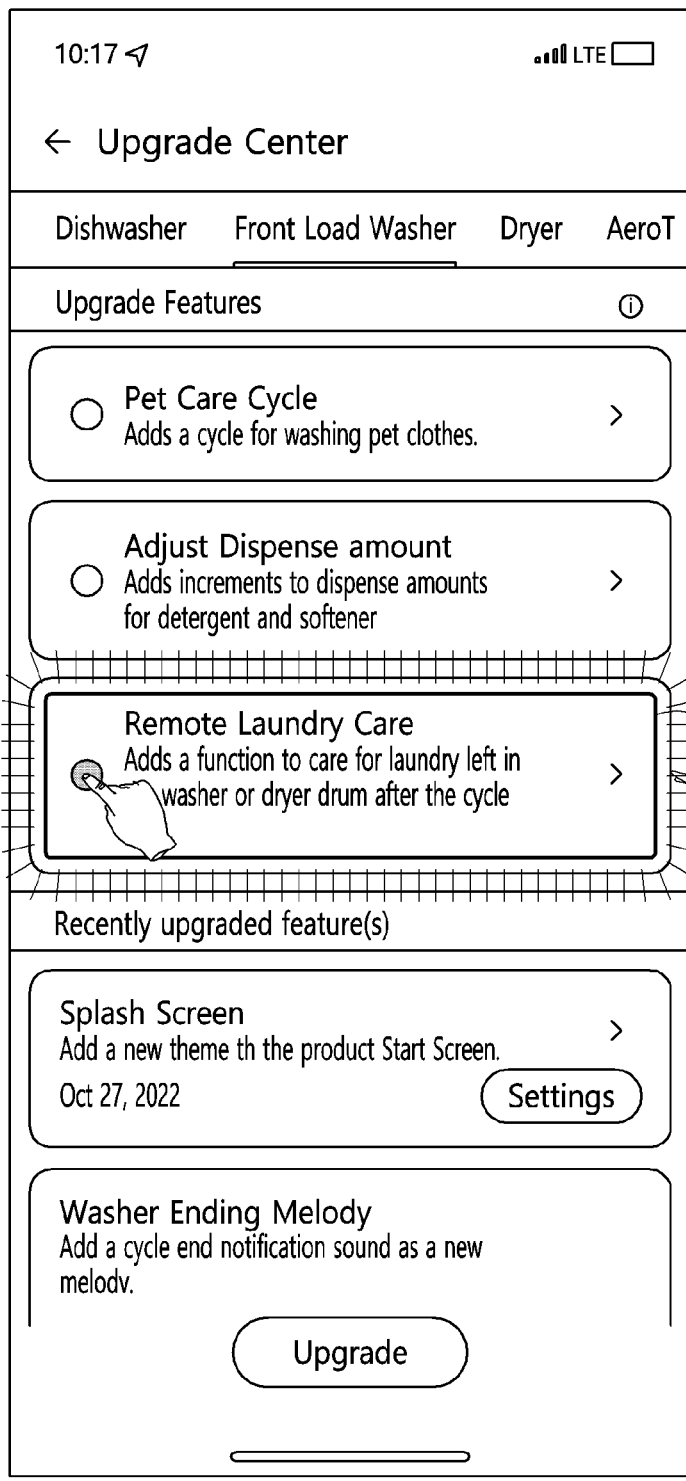
Figure 18:
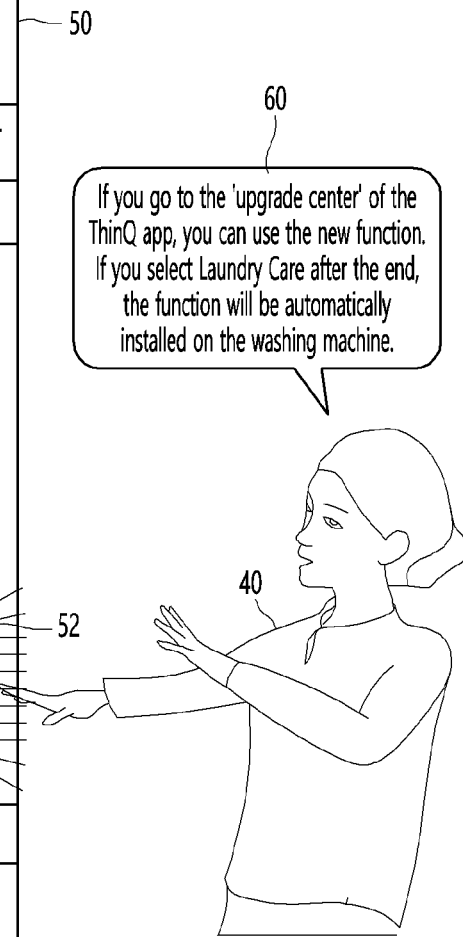

As illustrated in FIG. 18, in the present disclosure, the related content 50 associated with "laundry care after the end", which is an important keyword of the spoken sentence 60, may be acquired.

Next, in the present disclosure, when "laundry care after the end" corresponding to the keyword of the spoken sentence exists in the related content 50, the 2D position of the corresponding text associated with the laundry care may be mapped to 3D coordinates.

In the present disclosure, when the related content 50 is output to the surrounding space of the 3D agency 40, the motion of the 3D agency 40 may be controlled so that the hand position of the 3D agency 40 moves to the 3D position point corresponding to the laundry care-related text of the related content 50.

In the present disclosure, when the hand position of the 3D agency 40 moves to the 3D position point corresponding to the laundry care-related text of the related content 50, the laundry care-related text 52 of the related content 50 may be highlighted (55).

As an example, the 3D agency 40 may perform the utterance motion of the spoken sentence 60 "If you go to the upgrade center of the ThinQ app, you can use the new function. If you select Laundry Care after the end, the function will be automatically installed on the washing machine."

The 3D agency 40 may indicate the position of the laundry care menu of the related content 50 by hand by moving the hand position to the 3D position point corresponding to the laundry care-related text of the related content 50.

Figure 19:
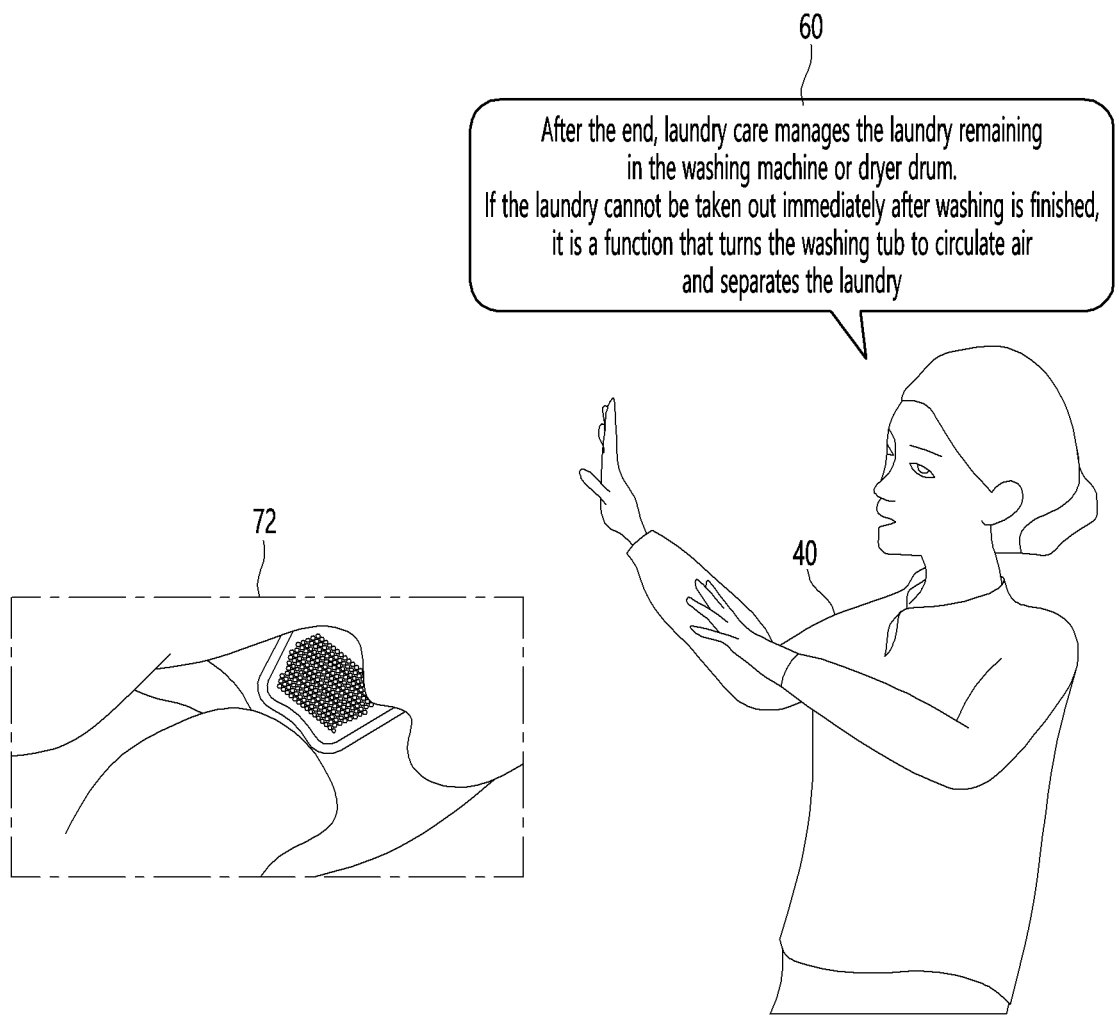

As illustrated in FIG. 19, in the present disclosure, the related content 50 associated with "laundry care after the end", which is an important keyword of the spoken sentence 60, may be acquired.

Next, in the present disclosure, when "laundry care after the end" corresponding to the keyword of the spoken sentence exists in the related content 50, the 2D position of the laundry care-related text may be mapped to 3D coordinates.

In the present disclosure, when a laundry care-related object 72 of the related content is output to the surrounding space of the 3D agency 40, the motion of the 3D agency 40 may be controlled so that the hand position of the 3D agency 40 moves to the 3D position point of the laundry care-related object 72 of the related content.

As an example, the 3D agency 40 may perform the utterance motion of the spoken sentence 60 "After the end, laundry care manages the laundry remaining in the washing machine or dryer drum. If the laundry cannot be taken out immediately after washing is finished, it is a function that turns the washing tub to circulate air and separates the laundry."

The 3D agency 40 may indicate the position of the laundry care-related object 72 by hand by moving the hand position to the 3D position point corresponding to the laundry care-related object 72 of the related content 50.

Figure 20:
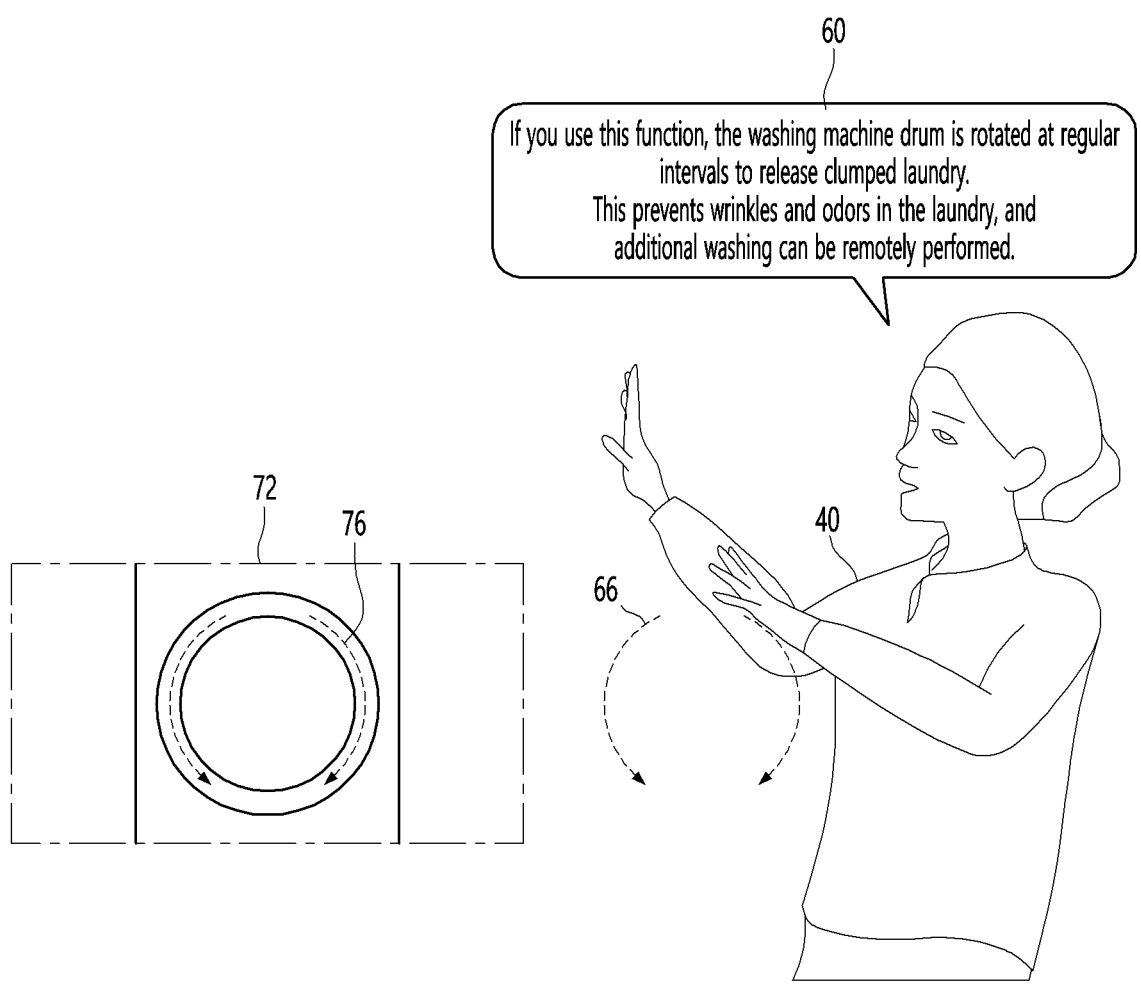

As illustrated in FIG. 20, in the present disclosure, the related content 50 associated with the "washing machine drum", which is an important keyword of the spoken sentence 60, may be acquired.

Next, in the present disclosure, when the "washing machine drum" corresponding to the keyword of the spoken sentence exists in the related content 50, the 2D position of the washing machine drum-related text may be mapped to 3D coordinates.

In the present disclosure, when a washing machine drum-related object 74 of the related content is output to the surrounding space of the 3D agency 40, the motion of the 3D agency 40 may be controlled so that the hand position of the 3D agency 40 moves to the 3D position point of the washing machine drum-related object 74 of the related content.

As an example, the 3D agency 40 may perform the utterance motion of the spoken sentence 60 "If you use this function, the washing machine drum is rotated at regular intervals to release clumped laundry. This prevents wrinkles and odors in the laundry, and additional washing can be remotely performed."

The 3D agency 40 may indicate the position of the laundry care-related object 72 by hand by moving the hand position to the 3D position point corresponding to the washing machine drum-related object 72 of the related content 50.

In addition, when the washing machine drum-related object 72 rotates in a specific direction 76, the 3D agency 40 may perform a hand motion in which the washing machine drum-related object 72 rotates in the same direction 66 as the specific direction 76.

Figure 21:
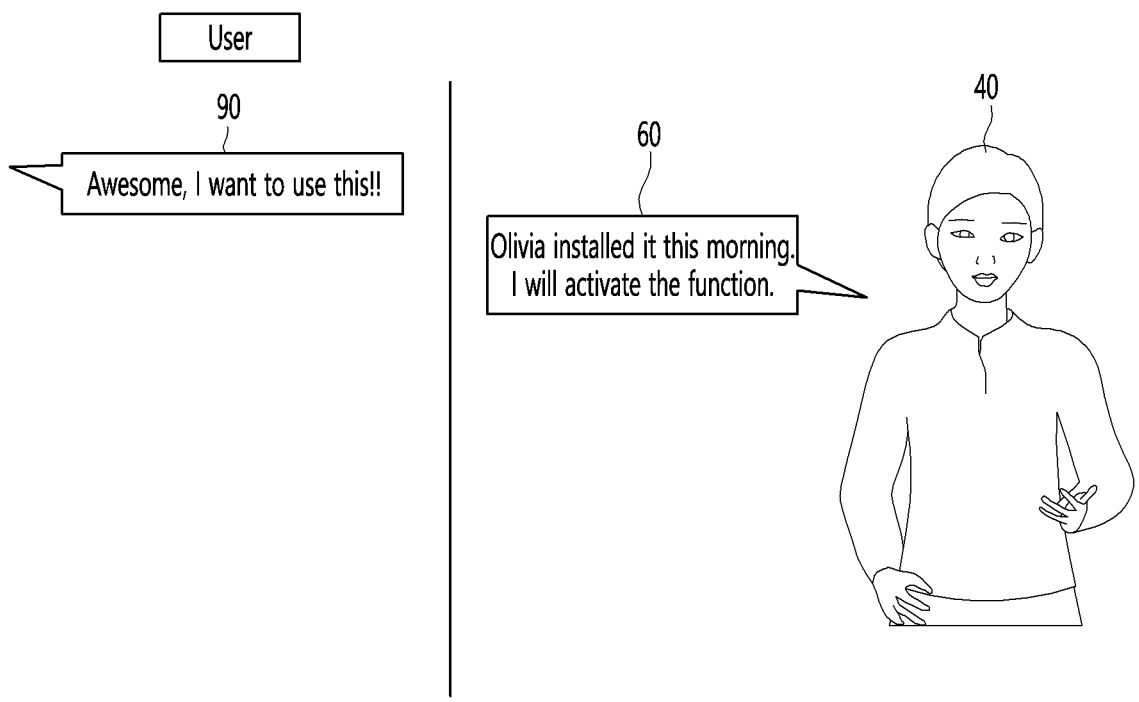

As illustrated in FIG. 21, the 3D agency 40 may perform the utterance motion of the spoken sentence 60 "Olivia installed it this morning. I will activate the function."

Next, when the user utters "Awesome, I want to use this!!" (90), the 3D agency 40 may perform the utterance motion of the spoken sentence 60 "Not at all. Please call me when necessary" as illustrated in FIG. 22.

Next, the user may utter "Thank you. ThinQ is smart as expected" (90).

As described above, in the present disclosure, the motion of the 3D agency may be controlled so that the 3D agency indicates the specific position of the 3D content corresponding to the spoken sentence, thereby providing a 3D content service that gives customers various interests and fun.

In addition, in the present disclosure, the 3D agency expressing the unique specific motion of the target persona may be generated to provide interest and fun to customers.

In addition, in the present disclosure, the 3D agency expressing not only the unique voice of the target persona but also the user-applied voice may be generated to provide various services to customers.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. In addition, the computer may include the processor 180 of the AI device.

According to an embodiment of the present disclosure, the artificial intelligence device may control the motion of the 3D agency so that the 3D agency indicates the specific position of the 3D content corresponding to the spoken sentence, thereby providing the 3D content service that gives customers various interests and fun.

In addition, in the present disclosure, the 3D agency expressing the unique specific motion of the target persona may be generated to provide interest and fun to customers.

In addition, in the present disclosure, the 3D agency expressing not only the unique voice of the target persona but also the user-applied voice may be generated to provide various services to customers.

In an artificial intelligence device according to the present disclosure, a motion of a 3D agency may be controlled so that the 3D agency indicates a specific position of 3D content corresponding to a spoken sentence, thereby providing a 3D content service that gives customers various interests and fun. Therefore, the industrial applicability is remarkable.

What is claimed is:

1. An artificial intelligence device comprising:
a memory configured to store a spoken sentence of a three-dimensional agency; and
a processor configured to control an operation of the three-dimensional agency corresponding to the spoken sentence,
wherein the processor is configured to:
upon generating the spoken sentence of the three-dimensional agency, extract a keyword of the spoken sentence;
acquire related content associated with the keyword of the spoken sentence to detect positions of an object and a text corresponding to the keyword in the related content;
upon determining that the object and the text corresponding to the keyword of the spoken sentence exist in the related content, map the positions of the object and the text corresponding to the keyword of the spoken sentence to three-dimensional coordinates;
output the related content to a surrounding space of the three-dimensional agency; and
control the operation of the three-dimensional agency so that the three-dimensional agency performs an utterance operation corresponding to the spoken sentence and an indication operation of indicating three-dimensional coordinates at which the object and the text are located.

2. The artificial intelligence device of claim 1, wherein the processor is configured to:
upon generating the spoken sentence of the three-dimensional agency, generate the three-dimensional agency that conducts a conversation with a user; and
upon detecting the user, generate the spoken sentence of the three-dimensional agency to be delivered to the user.

3. The artificial intelligence device of claim 1, wherein the processor is configured to:
upon generating the spoken sentence of the three-dimensional agency, generate the three-dimensional agency that conducts a conversation with a user; and
upon receiving a voice command as an input from the user, generate the spoken sentence of the three-dimensional agency to respond to the voice command.

4. The artificial intelligence device of claim 1, wherein the processor is configured to:
upon acquiring the related content, extract an important keyword from the generated spoken sentence;
search related content associated with the important keyword; and
upon determining that found related content is plural, acquire related content having a highest association with the spoken sentence.

5. The artificial intelligence device of claim 1, wherein, upon detecting the positions of the object and the text in the related content, the processor is configured to:
upon acquiring the related content, determine whether at least one of the object and the text is included in the related content;
upon determining that at least one object is included in the related content, detect object position information including position coordinates of the object and an object name corresponding thereto in the related content; and
upon determining that at least one text is included in the related content, detect text position information including position coordinates of the text and text corresponding thereto in the related content.

6. The artificial intelligence device of claim 1, wherein, upon mapping the positions of the object and the text to three-dimensional coordinates, the processor is configured to:
upon detecting a plurality of objects in the related content, determine similarity between the keyword of the spoken sentence and the plurality of objects;
extract position coordinates of an object of the plurality of objects in the related content having a highest similarity to the keyword of the spoken sentence; and
upon determining that the extracted position coordinates of the object are two-dimensional coordinates, map the two-dimensional coordinates of the object to three-dimensional coordinates.

7. The artificial intelligence device of claim 1, wherein, upon mapping the positions of the object and the text to three-dimensional coordinates, the processor is configured to:
upon detecting a plurality of texts in the related content, determine similarity between the keyword of the spoken sentence and the plurality of texts;
extract position coordinates of text having a highest similarity to the keyword of the spoken sentence; and
upon determining that the extracted position coordinates of the text are two-dimensional coordinates, map the two-dimensional coordinates of the text to three-dimensional coordinates.

8. The artificial intelligence device of claim 1, wherein, upon outputting the related content, the processor is configured to:
upon determining that a specific object of the related content is mapped to three-dimensional coordinates, output the related content so that a three-dimensional position point of the specific object is located around an upper body of the three-dimensional agency; and
upon determining that a specific text of the related content is mapped to three-dimensional coordinates, output the related content so that a three-dimensional position point of the specific text is located around the upper body of the three-dimensional agency.

9. The artificial intelligence device of claim 8, wherein the processor is configured to adjust a distance between the three-dimensional position point of the specific object or the specific text and the upper body of the three-dimensional agency in consideration of a length of an arm of the three-dimensional agency.

10. The artificial intelligence device of claim 1, wherein, upon outputting the related content, the processor is configured to:
upon determining that the three-dimensional agency starts an utterance operation corresponding to the spoken sentence, output the related content including at least one of the object and the text corresponding to the keyword of the spoken sentence.

11. The artificial intelligence device of claim 1, wherein, upon controlling the operation of the three-dimensional agency, the processor is configured to:

upon outputting the related content, control the operation of the three-dimensional agency so that a hand position of the three-dimensional agency moves to a three-dimensional position point of a specific object or specific text of the related content.

12. The artificial intelligence device of claim 11, wherein, upon controlling the operation of the three-dimensional agency, the processor is configured to:

upon determining that the hand position of the three-dimensional agency moves to the three-dimensional position point of the specific object or the specific text of the related content, control the operation of the three-dimensional agency so that a face direction and an eye's gaze direction of the three-dimensional agency are directed to the three-dimensional position point of the specific object or the specific text of the related content.

13. The artificial intelligence device of claim 11, wherein, upon determining that the hand position of the three-dimensional agency moves to the three-dimensional position point of the specific object or the specific text of the related content, the processor is configured to highlight and emphasize the specific object or the specific text of the related content.

14. The artificial intelligence device of claim 1, wherein, upon the operation of the three-dimensional agency being controlled, the processor is configured to:

upon determining that the related content including a specific object operating in a specific direction is output, control the operation of the three-dimensional agency so that a hand motion of the three-dimensional agency rotates in a same direction as the specific direction of the specific object.

15. A three-dimensional agency motion controlling method of an artificial intelligence device, the three-dimensional agency motion controlling method comprising:

generating a spoken sentence of a three-dimensional agency;

extracting a keyword of the spoken sentence;

acquiring related content associated with the keyword of the spoken sentence;

detecting positions of an object and a text in the related content;

determining similarity between the object and the text of the related content and the keyword of the spoken sentence;

mapping the positions of the object and the text similar to the keyword of the spoken sentence to three-dimensional coordinates;

outputting the related content to a surrounding space of the three-dimensional agency; and controlling an operation of the three-dimensional agency so that the three-dimensional agency performs an utterance operation corresponding to the spoken sentence and an indication operation of indicating three-dimensional coordinates at which the object and the text of the related content are located.

* * * * *